United States Patent
Calderon

(10) Patent No.: US 12,403,950 B2
(45) Date of Patent: Sep. 2, 2025

(54) AUTOMATIC STEERING SYSTEMS AND METHODS

(71) Applicant: Ag Leader Technology, Ames, IA (US)

(72) Inventor: Josue Calderon, Ames, IA (US)

(73) Assignee: Ag Leader Technology, Ames, IA (US)

( * ) Notice: Subject to any disclaimer, the term of this patent is extended or adjusted under 35 U.S.C. 154(b) by 32 days.

(21) Appl. No.: 17/724,120

(22) Filed: Apr. 19, 2022

(65) Prior Publication Data

US 2022/0332365 A1 Oct. 20, 2022

Related U.S. Application Data

(60) Provisional application No. 63/176,408, filed on Apr. 19, 2021.

(51) Int. Cl.
*B62D 6/00* (2006.01)
*B62D 5/04* (2006.01)

(52) U.S. Cl.
CPC .............. *B62D 6/00* (2013.01); *B62D 5/046* (2013.01)

(58) Field of Classification Search
CPC ... B60W 60/005; B62D 5/0415; B62D 1/046; B62D 6/00; B62D 15/025; B62D 1/286; B62D 5/04; A01B 69/008

(Continued)

(56) References Cited

U.S. PATENT DOCUMENTS 4,077,651 A    3/1978   Steinbach et al.
4,155,417 A *   5/1979   Ziems ...................... B62D 1/24
                                                                           318/587

(Continued)

FOREIGN PATENT DOCUMENTS

AU     2016287397 B2    6/2016
CN     108362267 A      8/2018

(Continued)

OTHER PUBLICATIONS

PIX4D, How to Calibrate a perspective lens camera, https://support.pix4d.com/hc/en-us/articles/206065716-How-to-calibrate-a-Perspective-Lens-Camera, Unknown—available as early as 2017.

(Continued)

*Primary Examiner* — Hung Q Nguyen
(74) *Attorney, Agent, or Firm* — DENTONS DAVIS BROWN PC; Matthew Warner-Blankenship

(57) ABSTRACT

An automatic steering system for an agricultural vehicle includes a controller operably coupled to a steering sensor configured to provide a feedback signal that includes vehicle steering information for automatically controlling the steering device. The controller is configured to receive the feedback signal and current steering information from the steering sensor and determine desired steering rate information based on the current steering information and a desired steering position. The controller is also configured to compare a current steering rate to the desired steering rate information and disengage automatic steering control based on comparing the current steering rate to the desired steering rate information. Automatic steering systems including assisted steering devices and methods for steering an agricultural vehicle are also provided.

20 Claims, 12 Drawing Sheets

(58) Field of Classification Search
USPC .......................................................... 701/41
See application file for complete search history.

(56) References Cited

U.S. PATENT DOCUMENTS

| | | | |
|---|---|---|---|
| 4,166,349 A | 9/1979 | Coenenberg | |
| 4,197,690 A | 4/1980 | Eistert | |
| 4,319,643 A | 3/1982 | Carter et al. | |
| 4,482,960 A | 11/1984 | Pryor | |
| 4,508,176 A | 4/1985 | Wiegardt | |
| 4,967,362 A | 10/1990 | Schutten | |
| 5,143,159 A | 9/1992 | Young | |
| 5,240,079 A | 8/1993 | Schmidt | |
| 5,253,172 A * | 10/1993 | Ito | B60T 8/172 |
| | | | 701/41 |
| 5,264,709 A | 11/1993 | Kamimura | |
| 5,279,068 A | 1/1994 | Rees et al. | |
| 5,471,391 A | 11/1995 | Gudat | |
| 5,585,626 A | 12/1996 | Beck | |
| 5,646,844 A | 7/1997 | Gudat et al. | |
| 5,837,997 A | 11/1998 | Beck | |
| 5,995,902 A | 11/1999 | Monson | |
| 6,089,344 A * | 7/2000 | Baughn | B62D 15/02 |
| | | | 701/41 |
| 6,198,992 B1 * | 3/2001 | Winslow | B60T 13/662 |
| | | | 180/443 |
| 6,236,936 B1 | 5/2001 | Berstis | |
| 6,275,771 B1 | 8/2001 | Berstis | |
| 6,338,023 B1 | 1/2002 | Bourgeois | |
| 6,463,374 B1 | 10/2002 | Keller | |
| 6,484,078 B1 | 11/2002 | Kageyama | |
| 6,490,539 B1 * | 12/2002 | Dickson | G06V 20/588 |
| | | | 340/684 |
| 6,501,422 B1 | 12/2002 | Nichols | |
| 6,529,823 B1 | 3/2003 | Berstis | |
| 6,686,951 B1 | 2/2004 | Dickson | |
| 6,732,024 B2 | 5/2004 | Rekow | |
| 6,741,921 B2 | 5/2004 | Cohen et al. | |
| 6,856,879 B2 | 2/2005 | Arakawa | |
| 6,917,300 B2 | 7/2005 | Allen | |
| 6,943,824 B2 | 9/2005 | Alexia et al. | |
| 6,946,824 B2 | 9/2005 | Waizman et al. | |
| 7,171,769 B2 | 2/2007 | Schultz | |
| 7,256,388 B2 | 8/2007 | Eglington | |
| 7,349,779 B2 | 3/2008 | Nelson | |
| 7,350,806 B2 | 4/2008 | Ridolfi | |
| 7,360,623 B2 | 4/2008 | Green et al. | |
| 7,369,924 B2 | 5/2008 | Han | |
| 7,628,239 B1 | 12/2009 | Louie | |
| 7,648,004 B1 | 1/2010 | Larouche et al. | |
| 7,734,386 B2 | 6/2010 | DelNero | |
| 7,777,615 B2 | 8/2010 | Okuda | |
| 8,078,338 B2 | 12/2011 | Pack | |
| 8,126,620 B2 | 2/2012 | Ringwald et al. | |
| 8,180,514 B2 | 5/2012 | Kaprielian et al. | |
| 8,195,342 B2 | 6/2012 | Anderson | |
| 8,214,111 B2 | 7/2012 | Heiniger | |
| 8,392,065 B2 | 3/2013 | Tolstedt | |
| 8,437,901 B2 | 5/2013 | Anderson | |
| 8,494,726 B2 | 7/2013 | Peake | |
| 8,589,013 B2 | 11/2013 | Pieper et al. | |
| 8,605,947 B2 | 12/2013 | Zhang | |
| 8,634,993 B2 | 1/2014 | McClure | |
| 8,639,408 B2 | 1/2014 | Anderson | |
| 8,706,394 B2 | 4/2014 | Trepagnier et al. | |
| 8,781,658 B2 | 7/2014 | Simonini | |
| 8,781,685 B2 * | 7/2014 | McClure | A01B 69/008 |
| | | | 701/41 |
| 8,814,640 B2 | 8/2014 | Behnke et al. | |
| 8,892,308 B2 | 11/2014 | Davis | |
| 9,002,565 B2 | 4/2015 | Jones | |
| 9,020,757 B2 | 4/2015 | Peake | |
| 9,043,096 B2 | 5/2015 | Zielke | |
| 9,052,714 B2 | 6/2015 | Creasey et al. | |
| 9,089,085 B2 | 7/2015 | Patel et al. | |
| 9,098,085 B2 | 8/2015 | Aznavorian | |
| 9,129,523 B2 | 9/2015 | Martin | |
| 9,162,703 B2 | 10/2015 | Miller et al. | |
| 9,188,986 B2 | 11/2015 | Baumann | |
| 9,213,905 B2 | 12/2015 | Lange | |
| 9,265,187 B2 | 2/2016 | Cavender-Bares | |
| 9,374,940 B2 | 6/2016 | Nelson | |
| 9,392,743 B2 | 7/2016 | Camacho-Cook et al. | |
| 9,393,990 B2 | 7/2016 | Davis | |
| 9,417,120 B2 | 8/2016 | Zielke | |
| 9,420,203 B2 | 8/2016 | Broggi et al. | |
| 9,420,737 B2 | 8/2016 | Spiller et al. | |
| 9,423,509 B2 | 8/2016 | Georgy | |
| 9,446,791 B2 | 9/2016 | Nelson, Jr. | |
| 9,451,367 B2 | 9/2016 | Basseas | |
| 9,464,913 B2 | 10/2016 | Brown et al. | |
| 9,489,576 B2 | 11/2016 | Johnson | |
| 9,503,850 B2 | 11/2016 | Sheha | |
| 9,510,498 B2 | 12/2016 | Tuttle et al. | |
| 9,527,211 B2 | 12/2016 | Posselius et al. | |
| 9,545,048 B2 | 1/2017 | Pickett et al. | |
| 9,582,002 B2 | 2/2017 | Cavender-Bares | |
| 9,615,497 B2 | 4/2017 | Bassett et al. | |
| 9,675,008 B1 | 6/2017 | Rusciolelli et al. | |
| 9,795,074 B2 | 10/2017 | Stratton | |
| 9,804,603 B1 | 10/2017 | Technology | |
| 9,807,934 B2 | 11/2017 | Rusciolelli et al. | |
| 9,840,003 B2 | 12/2017 | Szatmary | |
| 9,849,828 B2 | 12/2017 | Foster et al. | |
| 9,857,478 B2 | 1/2018 | Joughin | |
| 9,861,040 B2 | 1/2018 | Bonefas | |
| 9,880,560 B2 | 1/2018 | Han | |
| 9,898,688 B2 | 2/2018 | Bleiweiss | |
| 9,936,637 B2 | 4/2018 | Anderson | |
| 9,964,559 B2 | 5/2018 | Zielke et al. | |
| 9,996,081 B2 | 6/2018 | Owens | |
| 10,065,722 B1 | 9/2018 | Jaszewski | |
| 10,099,609 B2 | 10/2018 | Pagliani | |
| 10,104,822 B2 | 10/2018 | Couchman | |
| 10,104,827 B2 | 10/2018 | Adamchuk | |
| 10,114,378 B2 | 10/2018 | Korthals | |
| 10,130,022 B2 | 11/2018 | Kinze | |
| 10,131,376 B2 * | 11/2018 | Mortimer | B62D 5/0415 |
| 10,143,126 B2 | 12/2018 | Foster et al. | |
| 10,152,891 B2 | 12/2018 | Rusciolelli et al. | |
| 10,165,722 B2 | 1/2019 | Ackerman et al. | |
| 10,168,714 B2 | 1/2019 | Webber | |
| 10,206,324 B2 | 2/2019 | Gerrish | |
| 10,215,572 B2 | 2/2019 | Urano et al. | |
| 10,246,087 B2 | 4/2019 | Mitchell et al. | |
| 10,254,765 B2 | 4/2019 | Rekow | |
| 10,255,670 B1 | 4/2019 | Wu et al. | |
| 10,264,431 B2 | 4/2019 | Vandapel et al. | |
| 10,267,820 B2 | 4/2019 | Zielke | |
| 10,272,940 B2 | 4/2019 | Staehle | |
| 10,299,422 B2 | 5/2019 | Schleicher | |
| 10,324,471 B2 | 6/2019 | Etoh | |
| 10,328,934 B2 | 6/2019 | Minster | |
| 10,338,594 B2 | 7/2019 | Long | |
| 10,365,404 B2 | 7/2019 | Collins | |
| 10,384,709 B2 | 8/2019 | Joughin | |
| 10,398,084 B2 | 9/2019 | Ray et al. | |
| 10,407,873 B2 | 9/2019 | Ono | |
| 10,412,893 B2 | 9/2019 | Missotten et al. | |
| 10,479,354 B2 * | 11/2019 | Posselius | B60W 30/09 |
| 10,491,879 B2 | 11/2019 | Redden | |
| 10,531,603 B2 | 1/2020 | Ferrari | |
| 10,551,844 B2 | 2/2020 | Biber | |
| 10,575,453 B2 | 3/2020 | Blackwell | |
| 10,583,832 B2 * | 3/2020 | Foster | A01B 69/001 |
| 10,612,932 B2 | 4/2020 | Sunil Kumar | |
| 10,633,023 B2 | 4/2020 | Ghannam | |
| 10,635,110 B2 | 4/2020 | Shashua | |
| 10,684,305 B2 | 6/2020 | Zielke et al. | |
| 10,696,227 B2 | 6/2020 | Stein | |
| 10,698,402 B2 | 6/2020 | Kosa | |
| 10,747,233 B2 | 8/2020 | Ogura | |
| 10,780,930 B1 | 9/2020 | Kentley-Klay | |
| 10,788,835 B2 | 9/2020 | Hurd et al. | |

(56) References Cited

U.S. PATENT DOCUMENTS

| | | |
|---|---|---|
| 10,795,351 B2 | 10/2020 | Hurd |
| 10,820,508 B2 | 11/2020 | Dix |
| 10,822,017 B2 | 11/2020 | Tan |
| 10,845,810 B2 | 11/2020 | Flajolet |
| 10,962,376 B2 | 3/2021 | Fong |
| 10,966,369 B2 | 4/2021 | Suleman |
| 11,091,192 B2 | 8/2021 | McMickell |
| 11,092,696 B2 | 8/2021 | Eriksson |
| 11,093,745 B2 | 8/2021 | Redden |
| 11,212,954 B2 | 1/2022 | Maeder |
| 11,315,258 B1 | 4/2022 | Anagnostopoulos |
| 11,429,114 B2 | 8/2022 | Davis |
| 11,612,096 B2 | 3/2023 | Sivinski |
| 11,697,414 B2 | 7/2023 | Simmons |
| 11,790,539 B1 | 10/2023 | Anagnostopoulos |
| 2001/0048755 A1 | 12/2001 | Wiens |
| 2002/0059320 A1 | 5/2002 | Tamaru |
| 2002/0072850 A1 | 6/2002 | McClure |
| 2003/0023353 A1* | 1/2003 | Badarneh ............ B60Q 1/0082 701/1 |
| 2003/0085042 A1 | 5/2003 | Rogala |
| 2004/0158355 A1 | 8/2004 | Holmqvist |
| 2004/0264761 A1 | 12/2004 | Mas |
| 2005/0074143 A1 | 4/2005 | Kawai |
| 2006/0178825 A1 | 8/2006 | Eglington |
| 2007/0021913 A1 | 1/2007 | Heiniger |
| 2007/0071311 A1 | 3/2007 | Rovira-Mas |
| 2007/0112700 A1 | 5/2007 | Den Haan |
| 2008/0103690 A1 | 5/2008 | Dix |
| 2008/0141814 A1 | 6/2008 | Markfort |
| 2008/0215203 A1 | 9/2008 | Dix |
| 2008/0306655 A1* | 12/2008 | Ukai ..................... B62D 5/046 701/41 |
| 2009/0037041 A1 | 2/2009 | Senneff |
| 2009/0099730 A1 | 4/2009 | McClure |
| 2009/0112410 A1 | 4/2009 | Shull |
| 2009/0118904 A1 | 5/2009 | Birnie |
| 2010/0006308 A1 | 1/2010 | Schmidt |
| 2010/0026555 A1 | 2/2010 | Whittaker |
| 2010/0032492 A1 | 2/2010 | Grimm |
| 2010/0094481 A1 | 4/2010 | Anderson |
| 2011/0056753 A1 | 3/2011 | Middlemiss |
| 2011/0056762 A1 | 3/2011 | Markfort |
| 2011/0098890 A1* | 4/2011 | Lee ........................ B62D 1/286 701/42 |
| 2011/0196565 A1 | 8/2011 | Collins |
| 2011/0235923 A1 | 9/2011 | Weisenburger |
| 2012/0050023 A1 | 3/2012 | Sauder |
| 2012/0130593 A1* | 5/2012 | Davis ...................... B62D 1/28 701/41 |
| 2012/0215410 A1 | 8/2012 | McClure |
| 2013/0131925 A1 | 5/2013 | Isaji |
| 2013/0186657 A1 | 7/2013 | Kormann et al. |
| 2014/0163806 A1 | 6/2014 | Aznavorian |
| 2014/0324291 A1 | 10/2014 | Jones |
| 2015/0041238 A1* | 2/2015 | Davis ................... A01B 69/008 180/404 |
| 2015/0081156 A1 | 3/2015 | Trepagnier |
| 2015/0237795 A1 | 8/2015 | Koch |
| 2015/0264866 A1 | 9/2015 | Foster |
| 2015/0343403 A1 | 12/2015 | Ruhland |
| 2015/0359163 A1 | 12/2015 | Nelson |
| 2016/0214643 A1 | 7/2016 | Joughin |
| 2016/0229555 A1 | 8/2016 | Millin |
| 2016/0280250 A1 | 9/2016 | Stahle |
| 2017/0016870 A1 | 1/2017 | McPeek |
| 2017/0035726 A1 | 2/2017 | Preston et al. |
| 2017/0102702 A1 | 4/2017 | Ishijima |
| 2017/0135277 A1 | 5/2017 | Hiramatsu |
| 2017/0147005 A1 | 5/2017 | Ramm |
| 2017/0242095 A1 | 8/2017 | Schuh |
| 2017/0248963 A1 | 8/2017 | Levinson et al. |
| 2017/0249517 A1 | 8/2017 | Cho |
| 2017/0359941 A1 | 12/2017 | Czapka |
| 2018/0017965 A1 | 1/2018 | Kosa |
| 2018/0024549 A1 | 1/2018 | Hurd |
| 2018/0081058 A1 | 3/2018 | Kalscheur |
| 2018/0084727 A1 | 3/2018 | Andrios |
| 2018/0096605 A1 | 4/2018 | Bai |
| 2018/0201299 A1 | 7/2018 | Ashtari |
| 2018/0216942 A1 | 8/2018 | Wang |
| 2018/0326982 A1 | 11/2018 | Paris |
| 2018/0329415 A1* | 11/2018 | Aoi ..................... B60W 30/182 |
| 2019/0021211 A1 | 1/2019 | Gutknecht |
| 2019/0039626 A1* | 2/2019 | Hatano ................ B60W 30/14 |
| 2019/0071092 A1 | 3/2019 | Ma |
| 2019/0075706 A1 | 3/2019 | Cavender-Bares et al. |
| 2019/0090472 A1 | 3/2019 | Crinklaw |
| 2019/0124822 A1 | 5/2019 | Czapka |
| 2019/0133024 A1 | 5/2019 | Gerrish |
| 2019/0146511 A1 | 5/2019 | Hurd et al. |
| 2019/0174667 A1 | 6/2019 | Gresch |
| 2019/0275939 A1 | 9/2019 | Kim |
| 2019/0302799 A1 | 10/2019 | Schaff |
| 2020/0023835 A1 | 1/2020 | Harda |
| 2020/0100421 A1 | 4/2020 | Wang |
| 2020/0133262 A1 | 4/2020 | Suleman |
| 2020/0150673 A1 | 5/2020 | Qiu |
| 2020/0178455 A1 | 6/2020 | Ishikawa |
| 2020/0193589 A1 | 6/2020 | Peshlov et al. |
| 2020/0231210 A1 | 7/2020 | Anderson |
| 2020/0352082 A1 | 11/2020 | Maeder |
| 2020/0352088 A1 | 11/2020 | Arnett |
| 2021/0000006 A1 | 1/2021 | Ellaboudy |
| 2021/0003416 A1 | 1/2021 | Wilson et al. |
| 2021/0026362 A1 | 1/2021 | Wilson et al. |
| 2021/0051837 A1 | 2/2021 | Barry et al. |
| 2021/0053561 A1 | 2/2021 | Beller |
| 2021/0094539 A1 | 4/2021 | Beller |
| 2021/0132618 A1 | 5/2021 | Van Roekel |
| 2021/0161060 A1 | 6/2021 | Kaufmann |
| 2021/0185882 A1 | 6/2021 | Eichhorn |
| 2021/0195824 A1 | 7/2021 | Van Roekel |
| 2021/0195840 A1 | 7/2021 | Puryk |
| 2021/0294337 A1 | 9/2021 | Van Mill |
| 2021/0315147 A1 | 10/2021 | Fanshier |
| 2021/0364631 A1 | 11/2021 | Hasegawa et al. |
| 2021/0365036 A1 | 11/2021 | Dix |
| 2021/0396528 A1 | 12/2021 | St. Romain |
| 2022/0011444 A1 | 1/2022 | Eichhorn et al. |
| 2022/0026226 A1 | 1/2022 | Eichhorn |
| 2022/0061202 A1 | 3/2022 | Holoubek et al. |
| 2022/0078975 A1 | 3/2022 | Slichter |
| 2022/0105932 A1 | 4/2022 | Omikawa |
| 2022/0130145 A1 | 4/2022 | Connary |
| 2022/0232759 A1 | 7/2022 | Sauder |
| 2022/0272888 A1 | 9/2022 | Hodel |
| 2022/0284669 A1 | 9/2022 | Heinonen |
| 2022/0317688 A1 | 10/2022 | Li |
| 2022/0332365 A1 | 10/2022 | Calderon |
| 2022/0363280 A1 | 11/2022 | Calderon |
| 2022/0365163 A1 | 11/2022 | Baek |
| 2022/0386527 A1 | 12/2022 | Schleicher |
| 2023/0229163 A1 | 7/2023 | Rust |
| 2023/0230202 A1 | 7/2023 | Eichhorn et al. |
| 2023/0292664 A1 | 9/2023 | Zielke et al. |
| 2024/0000011 A1 | 1/2024 | Zielke et al. |
| 2024/0044346 A1 | 2/2024 | Barry et al. |
| 2024/0053759 A1 | 2/2024 | Wilson |
| 2024/0381803 A1 | 11/2024 | Wagner |
| 2024/0389494 A1 | 11/2024 | Vorobiev |
| 2025/0002070 A1 | 1/2025 | Brand |
| 2025/0008874 A1 | 1/2025 | Townsend |
| 2025/0169390 A1 | 5/2025 | Eichhorn |

FOREIGN PATENT DOCUMENTS

| | | |
|---|---|---|
| DE | 102013203549 A1 | 9/2014 |
| EP | 1773647 B1 | 2/2010 |
| EP | 2511152 A1 | 10/2012 |
| JP | 2022060934 A | 4/2022 |
| KR | 101728137 B1 | 4/2017 |
| WO | 2017004074 A1 | 1/2017 |

(56) References Cited

FOREIGN PATENT DOCUMENTS

| WO | 2017074863 A1 | 5/2017 |
|---|---|---|
| WO | WO2018165199 A1 | 9/2018 |
| WO | WO2019042956 A1 | 3/2019 |

OTHER PUBLICATIONS

Rankin 2008, Daytime mud detection for unmanned ground vehicle autonomous navigation, A.L. Rankin and L. H. Matthies, Dec. 2008.
Raven Precision, Viper 4+ Job Sync https://www.youtube.com/watch?v=ql8Q45OSxVU, Aug. 7, 2018.
Reid—1998, Precision guidance of agricultural vehicles, John F. Reid, 1998.
Rovira-Mas—2008, Stereo Vision three dimensional terrain maps for precision agriculture, Francisco Rovira-Mas Qin Zhang B John F Reidc, Mar. 2008.
Saarinen et al., 3D normal distributions transform occupancy maps; an efficient representation for mapping in dynamic environments, Saarinen, Jari P et al., Sep. 16, 2013.
Subramanian—2006, Development of machine vision and laser radar based autonomous vehicle guidance, VijaySubramaniana, Thomas F Burksa A A Arroyob, Sep. 2006.
Unverferth Mfg. Co., Inc., "Top Air Steerable Hitch", Unknown—available as early as 2016, Published in: Kalida, OH.
Bruns, Lidar-based Vehicle Localization in an Autonomous Valet Parking Scenario, 2016.
Cho—1999, Autonomous Seed sprayer guidance using machine vision and fuzzy logic, Cho, S.I. Ki, N. H., 1999.
Dronedeploy, Measurement Accuracy of the DJI Phantom 4 RTK & Photogrammetry, J. Mulakala, Unknown—available as early as 2019.
English—2014, Vision Based guidance for robot navigation in agriculture, Andrew English et al., Jun. 7, 2014.
Gyubeom et al., Parking Line Based SLAM Approach Using AVM/LiDAR Sensor Fusion for Rapid and Accurate Loop Closing and Parking Space Detection, 2019.
"Machine Sync Activation", https://www.deere.com/en/technology-products/precision-ag-technology/guidance/machine-sync/, Unknown—available as early as 2018, Publisher: John Deere US.
Leonard et al, Dyanmic map build for an autonomous mobile robot, Aug. 1, 1992.
Muller Elektronik GMBH & Co. KG, "Installation and Operating Instructions Trail-Control Manufacturer", Mar. 2001, Published in: Germany.
Muller-Elektronik GMBH & CO.KG, "Hardi Auto-Track Instruction Book", Jan. 10, 1996, Published in: Germany.
Muller-Elektronik GMBH & CO.KG, "Installation and Users Guide Trail—Control II", Sep. 1, 2010, Published in: Germany.
P. Barry and R. Coakley, 2015, Accuracy of UAV Photogrammetry Compared with Network RTK GPS.
Pajares—2016, Machine-Vision systems selection for agricultural vehicles: A Guide, Ganzalo Pajares, et al., Nov. 22, 2016.
PIX4D, Do RTK/PPK Drones give you better results than GCPs?, Aug. 26, 2017 https://www.pix4d.com/blog/rtk-ppk-drones-gcp-comparison.
PIX4D, Ground Control Points: why are they important?, Dec. 3, 2019, https://www.pix4d.com/blog/why-ground-control-points-important.
AutoFarm/Novariant system.
JD, CIH Steerable wheels.
Orthman—Steerable guidance coulters—Tracker IV.
Orthman 2.
Orthman 3.
Protracker Guidance Systems—300DB Hydraulic Hitch Specifications.
Raven Cart Automation—https://www.ravenind.com/products/autonomy/raven-cart-automation.
Tracking 1.
Tracking 2.
Ehab Ghanem, Kyle O'Keefe, and Richard Klukas. Testing vehicle-to-vehicle relative position and at-titude estimation using multiple uwb ranging. In 2020 IEEE 92nd Vehicular Technology Conference (VTC2020—Fall), pp. 1-5. IEEE, 2020.
OnTrac3—PN2006236.
Sunco Farm Equipment—Pull Implement Guidance.
Wei Jiang, Zhuojian Cao, Baigen Cai, Binghao Li, and Jian Wang. Indoor and outdoor seamless po-sitioning method using uwb enhanced multi-sensor tightly-coupled integration. IEEE Transactions on Vehicular Technology, 70 (10):10633-10645, 2021.
Yu Xianjia, Li Qingqing, Jorge Pena Queralta, Jukka Heikkonen, and Tomi Westerlund. Cooperative uwb-based localization for outdoors positioning and nav-igation of uavs aided by ground robots. In 2021 IEEE International Conference on Autonomous Sys-tems (ICAS), pp. 1-5. IEEE, 2021.
Anand et al., "AgriSegNet: Deep Aerial Semantic Segmentation Framework for IoT-Assisted Precision Agriculture", IEEE Sensors Journal, 2021, p. 17581-17590, vol. 21, No. 16.
Bhagat et al., "MS-Net: A Cnn Architecture for Agriculture Pattern Segmentation in Aerial Images", 2022, Publisher: Cham: Springer International Publishing.
Imai et al., "Shadow detection in hyperspectral images acquired by UAV", The International Archives of Photogrammetry, Remote Sensing and Spatial Information Sciences, 2019, pp. 371-377.
Innani et al., "Fuse-pn: A novel architecture for anomaly pattern segmentation in aerial agricultural images", 2021.
Shrestha et al., "Automatic Corn Plant Population Measurement Using Machine Vision", Agricultural and Biosystems Engineering Conference Proceedings and Presentations., 2001, No. 37.
Shrestha et al., "Shape and Size Analysis of Corn Plant Canopies for Plant Population and Spacing Sensing", 2005, pp. 295-303.
Tang et al., "Plant Identification in Mosaicked Crop Row Images for Automatic Emerged Corn Plant Spacing Measurement", 2008, pp. 2181-2191.
Thorp et al., "Using Aerial Hyperspectral Remote Sensing Imagery to Estimate Corn Plant Stand Density", 2008, pp. 311-320.
Wolters, D., "Assessment of Corn Plant Population at Emergence from Processed Color Aerial Imagery", 2015.
Agjunction—Wheelman Flex Installation Guide, Fit Kit: 810-0036-01.
Case IH Active Implement Guidance—https://www.youtube.com/watch?v=Kb059Tj1Q_k.
CHCNAV—ANX510 Se AutoSteer.
FJDynamics—GPS Guidance Auto Steer System for Tractor.
FJDynamics—Navigate to Next-level Efficiency—Fjd AT2 Auto Steer System.
John Deere—Auto Trac Universal (ATU) Steering Kit, 2007.
John Deere—Precision Ag Technology—AutoTrac Universal 300.
Orthman—Tracker implement guidance—UNKNOWN available as early as 2012—https://www.facebook.com/orthmanag/videos/tracker-implement-guidance/3057072390855/.
Raven Industries—Direcsteer, available as early as 2023—received Sep. 5, 24.
Raven Industries—SmartTrax MD Installation Manual, 2013—received Sep. 5, 24.
John Deere FarmSight—Active Implement Guidance, available as early as 2013—https://www.youtube.com/watch? v=JqBM1hH_MBs.
Trimble—EZ-Pilot Pro Guidance System, 2018.
Trimble—EZ-Steer System, 2010.
AutoFarm—OnTrac2, UNKNOWN available as early as 2009, https://www.farmprogress.com/farming-equipment/autofarm-introduces-ontrac2-gps-assisted-steering-system.
Novariant—Ontrac2+, UNKNOWN available as early as 2012.
Protracker Guidance Systems—400DB Hydraulic Hitch Specifications.
GameMaker Community—https://forum.gamemaker.io/index.php?threads/sprite-real-time-multi-recoloring-using-shaders. 12601, 2016—194493 Dec. 17, 24.
Ashley Napier, Paul Newman, "Generation and Exploitation of Local Orthographic Imagery for Road Vehicle Localisation", 2012,

(56) References Cited

OTHER PUBLICATIONS

2012 IEEE Intelligent Vehicles Sysmposium, pp. 590-596, DOI: 10.1109/IVS.2012.6232165.

* cited by examiner

Wheel angle sensor array

AUTOMATIC STEERING SYSTEMS AND METHODS

CROSS-REFERENCE TO RELATED APPLICATION(S)

This application claims priority to U.S. Provisional Application No. 63/176,408 filed Apr. 19, 2021, and entitled "Automatic Steering Systems And Methods," which is hereby incorporated by reference in its entirety under 35 U.S.C. § 119(e).

BACKGROUND

The disclosure generally relates to devices, systems, and methods for improving automatic steering systems and more particularly relates to disengaging the automatic steering of agricultural vehicles.

BRIEF SUMMARY

Various devices, systems and methods related to automatic steering systems for agricultural vehicles are described herein.

An automatic steering system for a vehicle is provided according to one aspect of the disclosure. The steering system includes an assisted steering device and a controller. The assisted steering device is configured to mount to a steering wheel of a vehicle and includes a motor and an encoder. The assisted steering device is further configured to determine current encoder information. The controller is configured to operate the assisted steering device. The operation includes receiving the current encoder information from the assisted steering device, determining a desired encoder rate based on the current encoder information and a desired encoder position, and operating the motor using the desired encoder rate. The operation also includes comparing a current encoder rate to desired encoder rate information and disengaging automatic steering control when a result of the comparison meets a manual steering condition.

In various implementations of the steering system the desired encoder rate information includes an acceptable encoder rate range. In some cases the acceptable encoder rate range is based on a history of the desired encoder rate. In some cases the manual steering condition includes the current encoder rate being outside the acceptable encoder rate range. In some cases the manual steering condition further includes the current encoder rate being outside the acceptable encoder rate range for a number of consecutive comparisons exceeding a counter threshold. In some cases the manual steering condition further includes the current encoder rate being outside the acceptable encoder rate range by a difference exceeding a difference threshold. In various implementations the current encoder information includes a current encoder position. In various implementations the current encoder information includes the current encoder rate.

According to another aspect of the disclosed technology, an automatic steering system for an agricultural vehicle includes a steering sensor configured to mount to an agricultural vehicle with a steering device. The steering sensor is configured to provide a feedback signal that includes vehicle steering information for automatically controlling the steering device. The automatic steering system also includes a controller operably coupled to the steering sensor. The controller is configured to receive the feedback signal and current steering information from the steering sensor and determine desired steering rate information based on the current steering information and a desired steering position. The controller is also configured to compare a current steering rate to the desired steering rate information and disengage automatic steering control based on comparing the current steering rate to the desired steering rate information.

In various implementations the controller is further configured to update a counter based on comparing the current steering rate to the desired steering rate information and disengage the automatic steering control when the counter exceeds a counter threshold. In various cases the controller is further configured to determine a difference between the current steering rate and the desired steering rate information and disengage the automatic steering control when the difference exceeds a difference threshold. In various implementations the desired steering rate information comprises a desired steering rate for operating the steering device. In various implementations the desired steering rate information comprises an acceptable steering rate range. In various implementations the controller is further configured to determine the acceptable steering rate range based on a history of a desired steering rate for operating the steering device.

In various implementations the automatic steering system also includes an assisted steering device configured to mount to a steering wheel of a vehicle. The assisted steering device includes a motor and an encoder. In addition, the controller is operably coupled to the assisted steering device, the steering sensor includes the encoder, the current steering information includes current encoder information, the desired steering rate information includes desired encoder rate information, and the current steering rate includes a current encoder rate.

A method for steering an agricultural vehicle is provided according to another aspect of the disclose technology. The method includes steering the agricultural vehicle with an automated steering device mounted to the vehicle and receiving a feedback signal that includes current steering information with a controller configured to operate the automated steering device. The method also includes comparing the current steering information to desired steering information and disengaging automatic steering control when a result of the comparison meets a manual steering condition.

According to various implementations, steering the agricultural vehicle includes steering with an assisted steering device mounted to a steering wheel of the vehicle. In some cases the assisted steering device includes the automated steering device. The method can further include receiving the feedback signal from the assisted steering device. In various cases the assisted steering device includes a motor and an encoder, the current steering information includes a current encoder rate, and the desired steering information includes an acceptable encoder rate range.

In some cases the manual steering condition includes the current encoder rate being outside the acceptable encoder rate range. In various implementations the manual steering condition further includes the current encoder rate being outside the acceptable encoder rate range for a number of consecutive comparisons exceeding a counter threshold. In various implementations the manual steering condition further includes the current encoder rate being outside the acceptable encoder rate range by a difference exceeding a difference threshold.

According to the various implementations, automatic steering systems include one or more controllers and/or computers that are configured to perform particular operations or actions by virtue of having software, firmware, hardware, or a combination of them installed on the system that in operation causes or cause the system to perform the operations or actions. One or more computer programs can be configured to perform particular operations or actions by virtue of including instructions that, when executed by data processing apparatus, cause the apparatus to perform the actions. Methods for steering an agricultural vehicle can be carried out with the use of one or more such controllers, computers, and/or computer programs.

Other examples of the disclosed implementations include corresponding computer systems, apparatus, and computer programs recorded on one or more computer storage devices, each configured to perform the actions of the methods. While multiple embodiments are disclosed, still other embodiments of the disclosure will become apparent to those skilled in the art from the following detailed description, which shows and describes illustrative embodiments of the disclosed apparatus, systems and methods. As will be realized, the disclosed apparatus, systems and methods are capable of modifications in various obvious aspects, all without departing from the spirit and scope of the disclosure. Accordingly, the drawings and detailed description are to be regarded as illustrative in nature and not restrictive.

DETAILED DESCRIPTION

Figure 1:
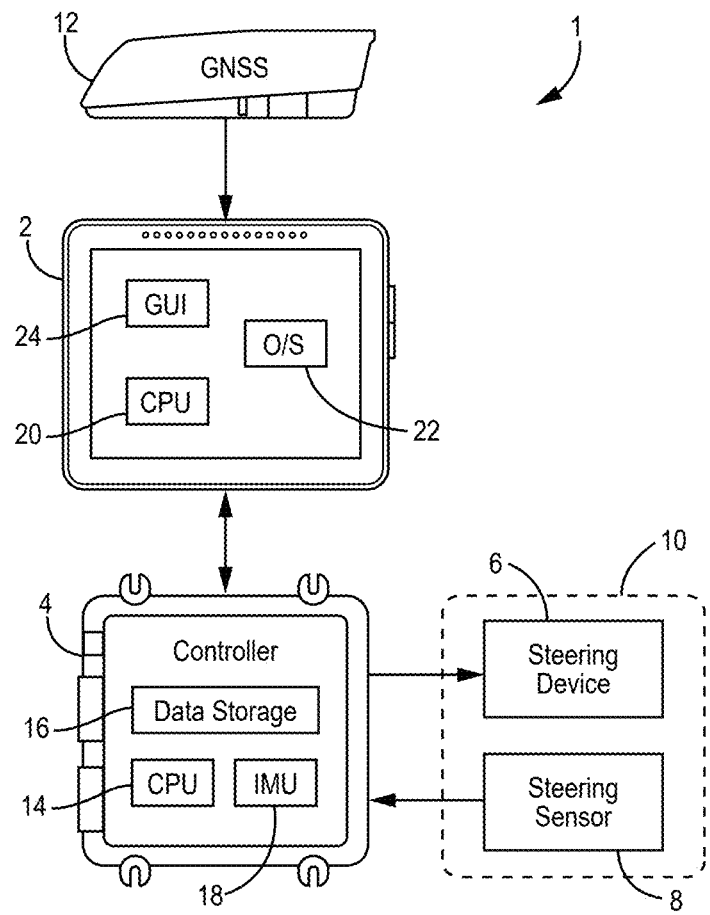
FIG. 1 is a schematic view of an automatic steering system for an agricultural vehicle according to an implementation.

The various embodiments disclosed and contemplated herein relate to automatic steering systems for agricultural vehicles. More specifically, various implementations of the disclosed embodiments enable transitioning from an automatic steering mode to a manual steering mode. Embodiments can further be described as disengaging from or overriding the automatic steering mode, reverting to manual steering, and/or providing a kickout process to kickout an automatic steering control and give steering control back to a human operator.

According to one aspect of the disclosure, an automatic steering system disengages from automatic steering control when an operator handles a vehicle steering wheel. For example, in some cases the system detects that the operator is manually turning the steering wheel and disengages the automatic steering mode in response. As another example, in some cases the system disengages automatic steering control after detecting that the operator has simply grabbed or is holding the steering wheel without turning the wheel. Reverting to manual steering control under these circumstances can be especially useful for enabling manual control while continuing to drive the vehicle straight ahead.

According to another aspect of the disclosure, an automatic steering system considers one or more criteria (also referred to herein as conditions) to determine whether to disengage automatic steering. In some implementations, the steering system evaluates the length of time that an operator handles a steering wheel before disengaging automatic steering. As one example, in some cases a steering system transitions from automatic to manual steering after an operator has held a steering wheel for a certain period of time. In some implementations, the system compares an expected turning rate with an actual turning rate to determine whether to revert to manual steering. For example, in some cases the system determines if the vehicle (e.g., the steering wheel) is turning more quickly or slowly than expected or in a different direction than expected. In some cases the system transitions from automatic to manual steering when at least one of the actual turning speed and direction is different from the expected turning speed and direction. In such cases differences between automatic steering commands and actual movement of the steering wheel help determine if an operator is physically overriding the automatic steering, thus indicating a desire to switch to manual steering.

According to various implementations, an automatic steering system determines whether to disengage automatic steering without needing to consider the force applied to the steering wheel by the operator. Although sensing torque applied to a steering drive motor is a potentially useful way to determine an operator's desire for manual steering, solely relying on this technique also requires limiting the output torque of the drive motor so that the operator can physically override the automatic steering. As will be further discussed herein, various implementations of the disclosed technology advantageously detect operator handling of a steering wheel without per se sensing the torque and/or current draw of the steering drive motor, thus avoiding the corresponding need to limit the output torque of the steering drive motor.

According to another aspect of the disclosure, various implementations of an automatic steering system use a feedback signal with steering information to determine whether to disengage or kickout the automatic steering control. In various implementations the steering information in the feedback signal indicates an actual turning rate of the vehicle's steering wheel and/or one or more vehicle wheels. For example, in some cases the feedback signal indicates how fast the vehicle steering wheel is turning and in which direction. In various implementations the steering information includes a steering position of the vehicle's steering wheel and/or one or more vehicle wheels.

In certain cases, the determination to disengage from automatic steering control at least partly depends on whether one or more characteristics of the feedback signal meet one or more manual steering criteria or conditions. For example, in certain implementations a determination that the actual turning rate is zero indicates that the vehicle operator is holding the steering wheel and meets a manual steering condition. In various implementations determining whether manual steering condition(s) are met involves comparing steering information from the feedback signal with expected (also referred to herein as "desired" or "target" or "targeted") steering information. As an example, in various implementations the actual turning rate indicated by the feedback signal is different from an expected or targeted rate of turning, which can indicate that an operator is physically turning the steering wheel. As another example, the steering position (e.g., of the vehicle's wheels or steering wheel) indicated by a feedback signal may be different from an expected or desired steering position. An automated steering system can thus disengage automatic steering control under one or more of these or other circumstances.

In various implementations the feedback signal(s) are generated by one or more steering sensors. As an example, in some cases a steering encoder or another sensor that is part of an assisted steering system may generate a steering feedback signal. In some cases one or more feedback signals are received from a steering sensor through a Controller Area Network (CAN) bus or another vehicle network. For example, a vehicle steering sensor may generate and transmit a feedback signal to the CAN bus that includes a steering wheel or vehicle wheel position and/or turning rate. In some cases an automated steering system may receive one or more feedback signals from a wheel angle sensor that provides a wheel angle position or rate. In some cases a factory installed or aftermarket wheel angle sensor generates a steering feedback signal that can be used by an automatic steering system to control, for example, an integrated valve steering mechanism. As another example, in some cases a vehicle's steering wheel may be equipped with one or more rotational sensors that generate feedback signals based on the wheel's rotational position and/or rate of turning. Other sources for feedback about the current steering angle and/or rate of change are also possible. Turning to the drawings, FIG. 1 is a schematic view of an automatic steering system 1 for an agricultural vehicle according to various implementations. As depicted in this particular example, the automatic steering system 1 includes a display unit 2 in communication with a steering controller 4. The steering controller 4 is coupled in communication with a vehicle steering device 6 and a vehicle steering sensor 8. According to various implementations the steering device 6 and the steering sensor 8 are part of an integrated steering mechanism 10.

In various implementations, the automatic steering system 1 is also operationally integrated with a GNSS or GPS unit 12, such as a GPS 7500, such that the system 1 is configured to input positional data for use in defining boundaries, locating the vehicle, plotting guidance, and the like, as will be readily appreciated. As an example, in some cases the controller 4 is configured to determine (e.g., estimate) the current position and/or trajectory of the vehicle using data from the GNSS/GPS unit 12.

According to various implementations, the controller 4 includes one or more processing and computing components for implementing various technologies disclosed herein and elsewhere. As shown in FIG. 1, some of the components of the controller 4 can include a CPU or processor 14, data storage 16, and an optional inertial measurement unit (IMU) 18. The controller 4 is communicatively coupled with the display 2. In some cases the display 2 includes its own processing and computing component(s), such as a CPU or other processor 20, which runs an operating system 22 that provides a graphical user interface (GUI) 24. One example of a display unit is the display unit sold under the name InCommand® by Ag Leader Technology of Ames, Iowa. It is appreciated that the display 2 may include a touchscreen and/or be equipped with interface components such as a keyboard, mouse, and/or other device for interacting with the system 1.

It should be appreciated that the controller 4 may be located in one of many places according to various implementations. For example, in some cases the controller is a discrete physical component mounted separately from other components. In some cases the controller is mounted within and/or is integral to another component, such as the display unit 2, the steering mechanism 10, or another component. In the depicted example the display 2 is provided separately from the controller 4. It should be appreciated that the various components of the display 2 and the controller 4 are in operational communication with one another via wired or wireless connections and are configured to perform processes and execute commands to implement operations and features described herein.

According to various implementations, the controller 4 is configured to determine a desired trajectory and control the steering device 6 to steer the vehicle along the desired trajectory. As an example, in some cases the controller is configured to determine a vehicle curvature that will guide the vehicle from its current position to a new position along the desired trajectory. In various implementations the controller determines the vehicle curvature as a desired steering angle or position of the vehicle wheel(s) and/or steering wheel. The controller is configured to then determine a turning rate (e.g., in terms of speed and direction) to bring the steering wheel or vehicle wheel(s) from its current position to the desired position within a particular amount of time. It is appreciated that in various implementations, one or more controller is provided.

In various implementations the system 1 also includes a communications component (not shown) configured for sending and receiving data to one or more cloud-based locations for processing and storage. As examples, data may be transmitted to and from a remote server, database, and/or other cloud computing components readily understood in the art. Such connections by the communications component can be made wirelessly via understood internet and/or cellular technologies such as Bluetooth, Wi-Fi, LTE, 3 G, 4 G, or 5 G connections and the like. It is understood that in certain implementations, the communications component and/or cloud components comprise encryption or other data privacy components such as hardware, software, and/or firmware security aspects. In various implementations, the operator or enterprise manager or other third parties are able to receive notifications such as adjustment prompts and confirmation screens on their mobile devices, and in certain implementations can review the plotted guidance paths and make adjustments via their mobile phones.

As depicted in the example of FIG. 1, in some cases the steering device 6 and the steering sensor 8 are part of an integrated steering mechanism 10. For example, the integrated steering mechanism 10 can in some cases be an assisted steering device that includes a motor drive unit (MDU) with a drive motor configured to rotate the vehicle's steering wheel in response to commands from the controller. In such a case, the steering sensor 8 is provided by a motor encoder that senses rotation of the motor using, for example, a Hall-effect sensor. The MDU generates and sends a feedback signal to the controller 4 based on the sensor output.

According to various implementations, the steering device 6 may be a hydraulic valve that is part of an integrated hydraulic steering system. As another example, in some cases the steering device 6 may be an OEM or factory-installed steering control system (e.g., including a hydraulic, electric, electrohydraulic, or another type of steering device) that is controllable through a Controller Area Network (CAN) bus or another vehicle network. In such examples, the steering sensor 8 may be provided as part of an integrated steering system or an OEM steering control system or may be provided separately as a dealer or aftermarket installed sensor.

According to various implementations, the steering sensor 8 may be one of various types of sensors suitable for generating one or more feedback signals conveying steering information. As noted above, in some cases the steering sensor 8 is provided by a motor encoder. In various cases the steering sensor 8 is a factory installed or aftermarket wheel angle sensor that generates a steering feedback signal. As another example, in some cases a vehicle's steering wheel may be equipped with one or more rotational sensors that generate feedback signals based on the wheel's rotational position and/or rate of turning. In some cases the steering sensor 8 may include a strain gauge that changes resistance as it bends, Measuring the resistance enables determination of the amount of bend in the sensor, which can enable measuring an angle of a wheel relative to a vehicle when attached to a wheel linkage. Such a measurement could also provide the position of the wheel (also called the vehicle's wheel angle). In various other cases, the steering sensor 8 may be a pressure sensor. For example, the sensor may measure the changing pressure in a valve attached between the wheel and the vehicle. Turning the wheel changes the wheel angle, which in turn changes the valve pressure, which can be sensed and sent to the controller as a feedback signal. Of course other types of steering sensors are possible and implementations of the disclosed technology are not limited to any one type of steering sensor.

Figure 2:
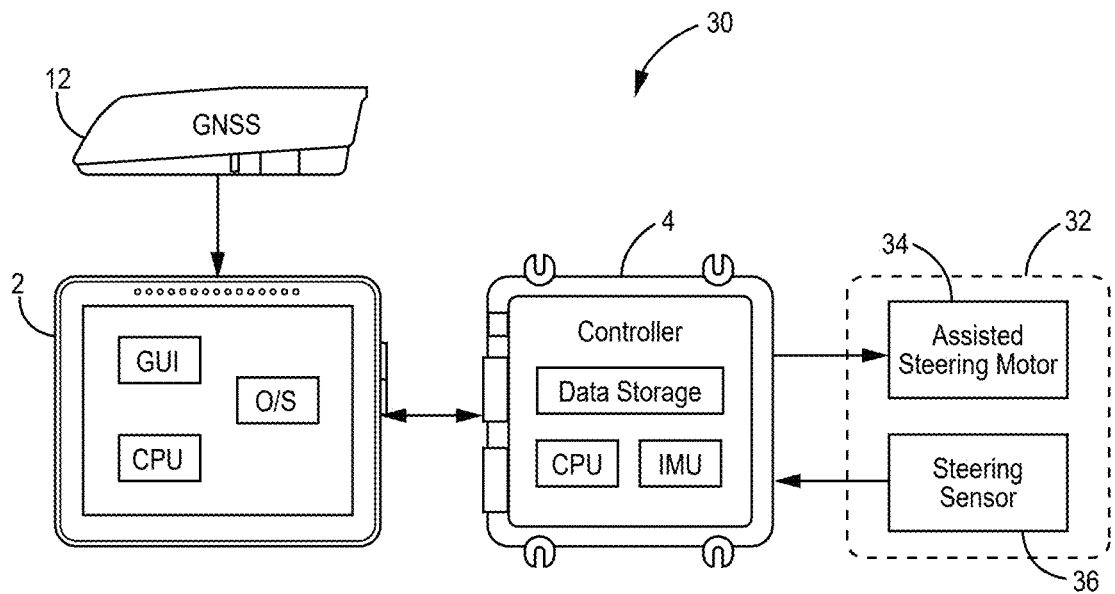
FIGS. 2-4 are schematic views of automatic steering systems for an agricultural vehicle according to various implementations.
Figure 3:
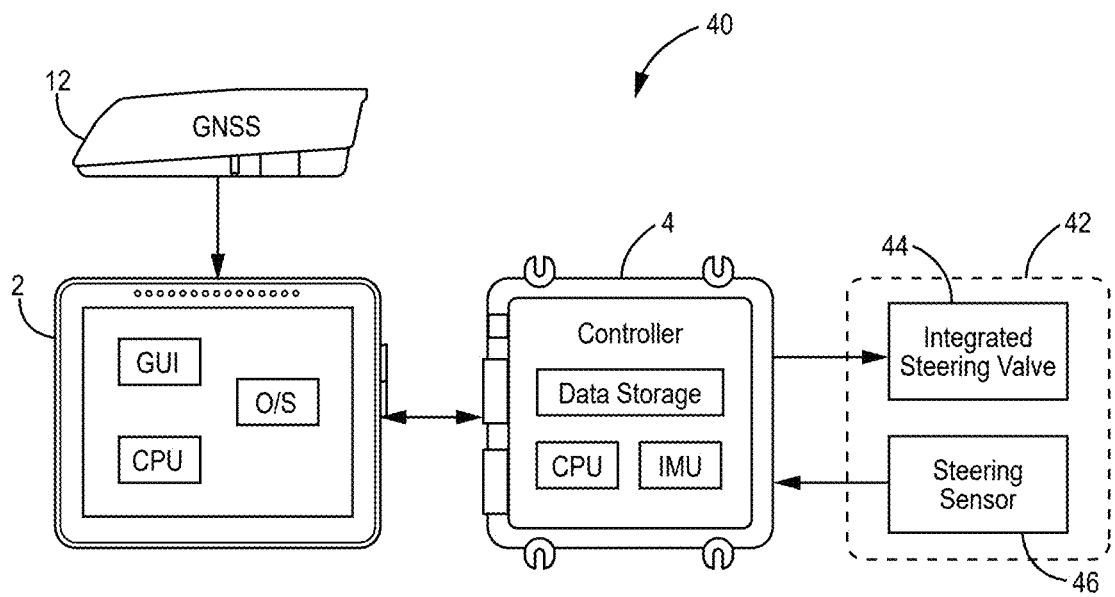
Figure 4:
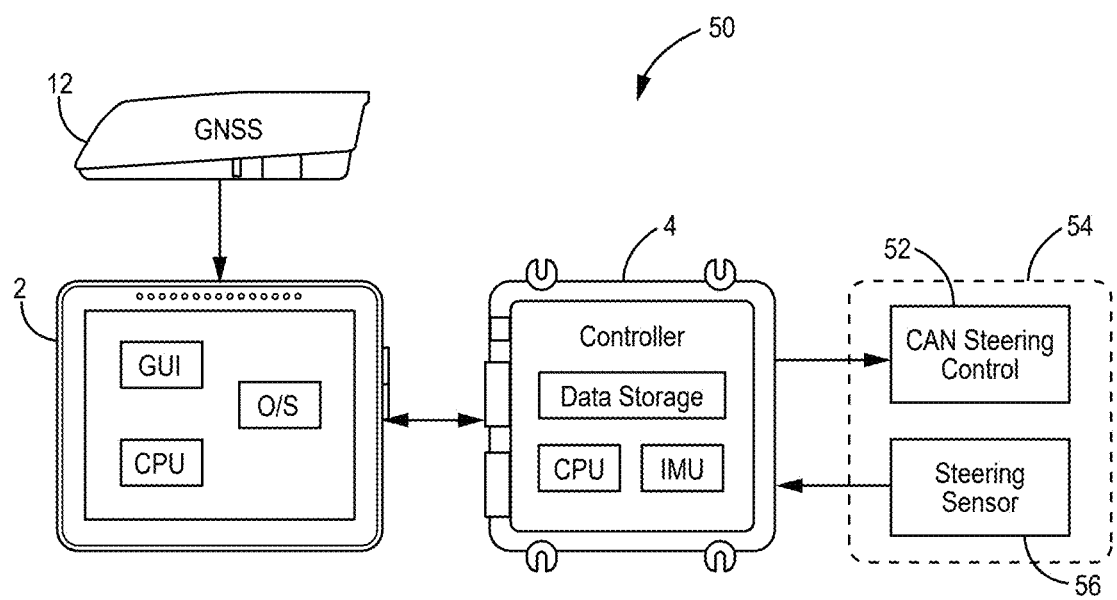

FIGS. 2-4 are schematic views of various automatic steering systems for an agricultural vehicle according to various implementations. The steering systems include several components in common with the system 1 shown in FIG. 1, but in each case include a differing type of automated steering device. FIG. 2 illustrates an example of an automatic steering system 30 that includes an assisted steering device 32 in communication with the steering controller 4. The assisted steering device 32 includes a steering motor 34 and a steering sensor 36. One example of an assisted steering device is a motorized system that attaches directly to a vehicle's steering wheel. The system's motor simulates a human physically turning the steering wheel to turn the vehicle's wheels. In some cases the steering sensor 36 is provided by a motor encoder that senses rotation of the steering motor 34 using, for example, a Hall-effect sensor. As shown in FIG. 2, the steering motor 34 and steering sensor 36 are in some cases provided as part of an integrated assisted steering device 32. It should be appreciated that in various implementations the steering motor and steering sensor may be provided separately as well.

FIG. 3 illustrates a schematic diagram of another automatic steering system 40 that includes a steering mechanism 42 with an integrated steering valve 44 according to various implementations. As an example, in some cases the steering valve 44 is a hydraulic valve that attaches directly to the vehicle's wheels or steering linkage. The controller 4 is configured to send the valve 44 a command that actuates the valve, thus pushing on the vehicle's wheel and causing it to turn. In various cases the integrated steering valve is built into an agricultural vehicle, such as a tractor and movement of the valve does not result in the steering wheel turning in the cab. In some cases an agricultural vehicle may be equipped with a steering valve at the factory, while in some cases an aftermarket valve may be installed. The steering mechanism 42 also includes a steering sensor 46, which in some cases is housed and mounted to the vehicle separately from the steering valve 44. In some cases the steering sensor 46 may be implemented by one of the sensors described herein, or by any other sensor of suitable design.

FIG. 4 illustrates a schematic diagram of another automatic steering system 50 that includes a steering mechanism 52 with an OEM or factory-installed steering control 54 (e.g., including a hydraulic, electric, electrohydraulic, or another type of steering device) that is controllable through a Controller Area Network (CAN) bus or another vehicle network. The steering mechanism 52 also includes a steering sensor 56, which in some cases is housed and mounted to the vehicle separately from the steering control 54. In some cases the steering sensor 56 may be implemented by one of the sensors described herein, or by any other sensor of suitable design.

Figure 5:
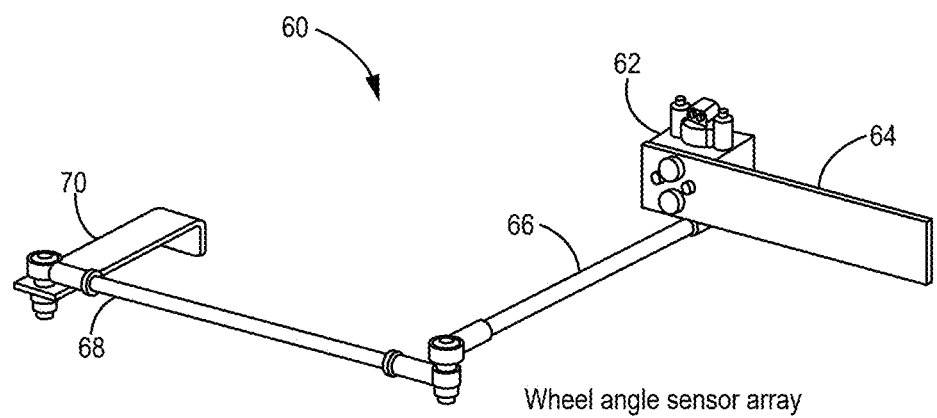
FIG. 5 is a perspective view of a wheel angle sensor kit according to an implementation.

Turning to FIG. 5, a perspective view of a wheel angle sensor kit 60 is depicted according to various implementations. The kit 60 generally includes a wheel angle sensor assembly 62 mounted to a sensor bracket 64 for coupling the sensor to a stational point on an agricultural vehicle, such as a fixed point on the chassis or axle housing. A linkage arm 66 and a linkage rod 68 couple to the sensor assembly 62 to a linkage rod bracket 70, which can be mounted to a moving part of the steering system, such as a wheel support or steering linkage. As the vehicle's wheel turns, the interconnected linkages actuate the sensor assembly 62, thus generating a feedback signal corresponding to the wheel's steering position and/or turning rate.

Figure 6:
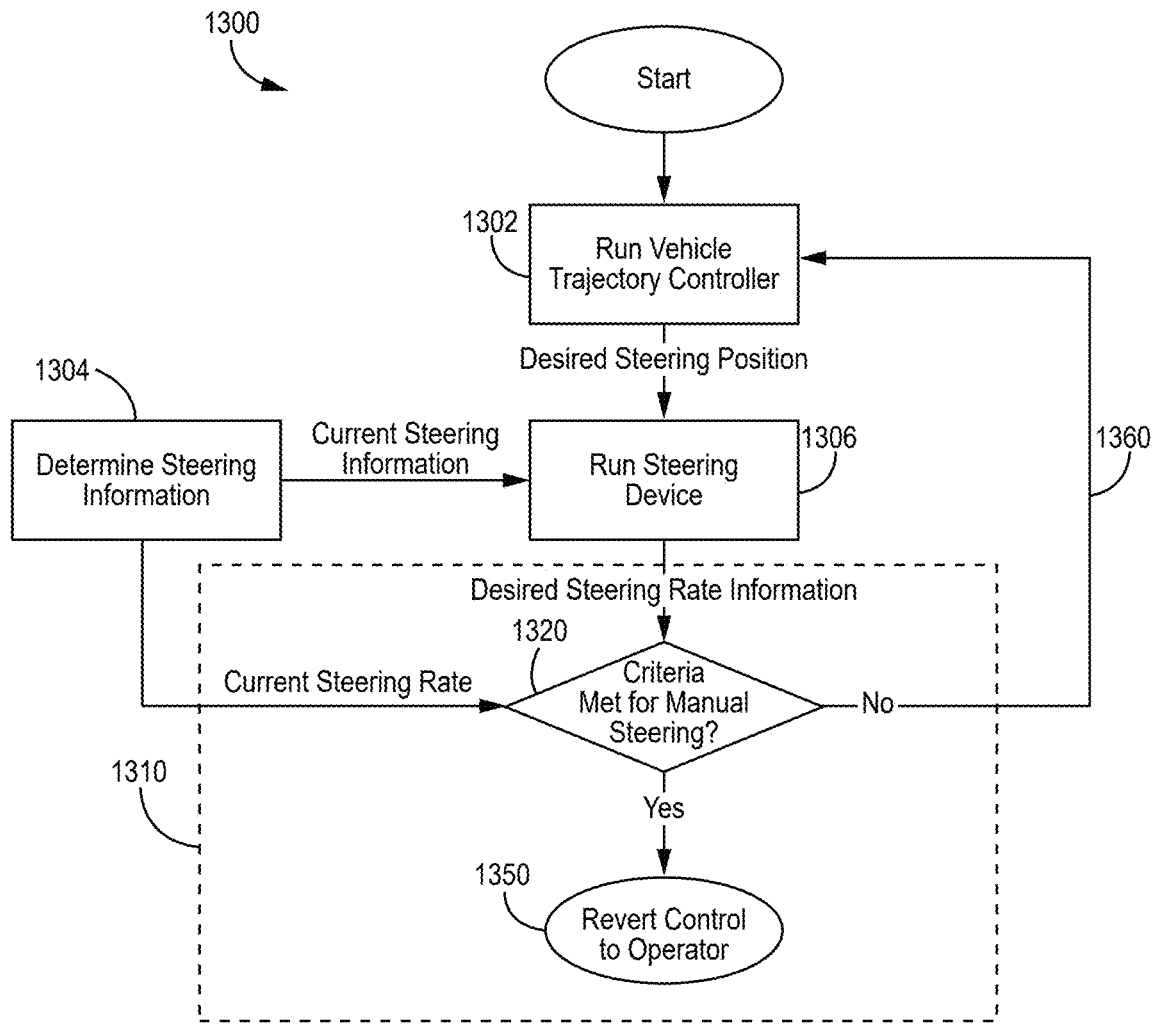
FIG. 6 is a flow diagram illustrating operation of an automatic steering system according to an implementation.

FIG. 6 is a flow diagram illustrating operation 1300 of an automatic steering system according to various implementations. Among other things, the automatic steering system's operation includes running 1302 a vehicle trajectory controller to generate a desired steering position for adjusting the steering of a vehicle. The desired steering position may correspond to, for example, a wheel position or a steering wheel position that will result in a particular steering curvature. As shown in FIG. 6, the steering system also determines 1304 steering information. In some cases, a steering sensor, such as a motor encoder, a wheel angle sensor, a pressure sensor, strain gauge sensor, or another type of sensor measures various properties of a vehicle's steering wheel, wheels, and/or steering devices and reports the information. In various implementations the determined steering information includes current steering information. Examples of current steering information are current encoder information for a motor encoder, current resistance measurements for a strain gauge sensor, current readings for a potentiometer or Hall effect sensor, and the like. In some cases the current steering information includes a current steering position, a current steering rate, or both. The desired steering position is then used along with one or both of the current steering rate and the current steering position to run 1306 a steering device to change the vehicle's steering trajectory. As an example, in some cases a desired steering position is used along with one or both of a current steering position and a current steering rate to determine a desired steering rate for moving the steering device (and connected steering linkages, steering wheel, wheels, etc.) to the desired position.

In the depicted implementation, the operation of the automatic steering system includes a kickout analysis or process 1310 that determines whether to disengage automatic steering control of the vehicle. In general, the kickout process 1310 includes analyzing 1320 a current steering rate and desired steering rate information. In various implementations, the desired steering rate information is based on the desired steering position and one or both of the current steering position and current steering rate. As an example, in some cases the desired steering rate information includes a desired steering rate generated to run 1306 the steering device as previously discussed. In some cases the desired steering rate information may be based on additional processing of a desired steering rate and may include, for example, a history of desired steering rates.

When the analysis determines that condition(s) for manual steering control are met, the automatic steering is disengaged and control reverts 1350 to the operator. In some circumstances the analysis 1320 may instead determine that manual steering criteria are not met. In these cases the operational flow loops back 1360 to continue automatic steering control by running 1302 the vehicle trajectory controller until a subsequent kickout routine 1310 begins. It will be appreciated that in various implementations the analytical logic may be switched while retaining the same substantive analysis. For example, in some cases the analysis may instead ask if condition(s) for automatic steering control are met, with a true answer leading to the continuation of automatic steering control and a false answer leading to manual steering control.

According to various implementations, the automatic steering operation 1300 is carried out by an automatic steering system such as one of the systems shown in FIGS. 1-4. In such cases the steering system controller(s) operate(s) as one or both of the steering device controller and trajectory controller in FIG. 6. In various implementations, one or more controllers are provided to accomplish the functionality described herein, as would be appreciated.

In some cases the steering system controller also determines 1320 if manual steering conditions or criteria are met and reverts control 1350 to the operator or loops control back 1360 to the vehicle trajectory controller process 1302. According to various implementations, one or more additional controllers may carry out portions of the operation 1300. As just one example, in some cases an entirely separate vehicle trajectory controller determines the vehicle's position and generates a desired steering position for correcting the vehicle's trajectory.

Various criteria, conditions, and/or analyses are used to evaluate the current steering rate and the desired steering rate information (e.g., desired steering rate) in various implementations. As an example, in some cases the steering system evaluates the desired steering rate information and the current steering rate to determine how the vehicle's steering is tracking with the trajectory determined by the vehicle trajectory controller. In some cases differences between the desired and current steering rates indicate that an operator is holding the steering wheel and/or overriding the automatic steering by physically turning the steering wheel. In such cases the system disengages the automatic steering control and reverts control 1350 to the operator.

In some cases a lag exists between determining a desired steering position and desired steering rate and the steering system responding accordingly. Various implementations of an automatic steering system address such a lag by comparing a current steering rate with desired steering rate information that includes a history of desired steering rates. Such an analysis enables the steering system to determine if the steering rates reported from the steering sensor are tracking in the expected direction.

Figure 7:
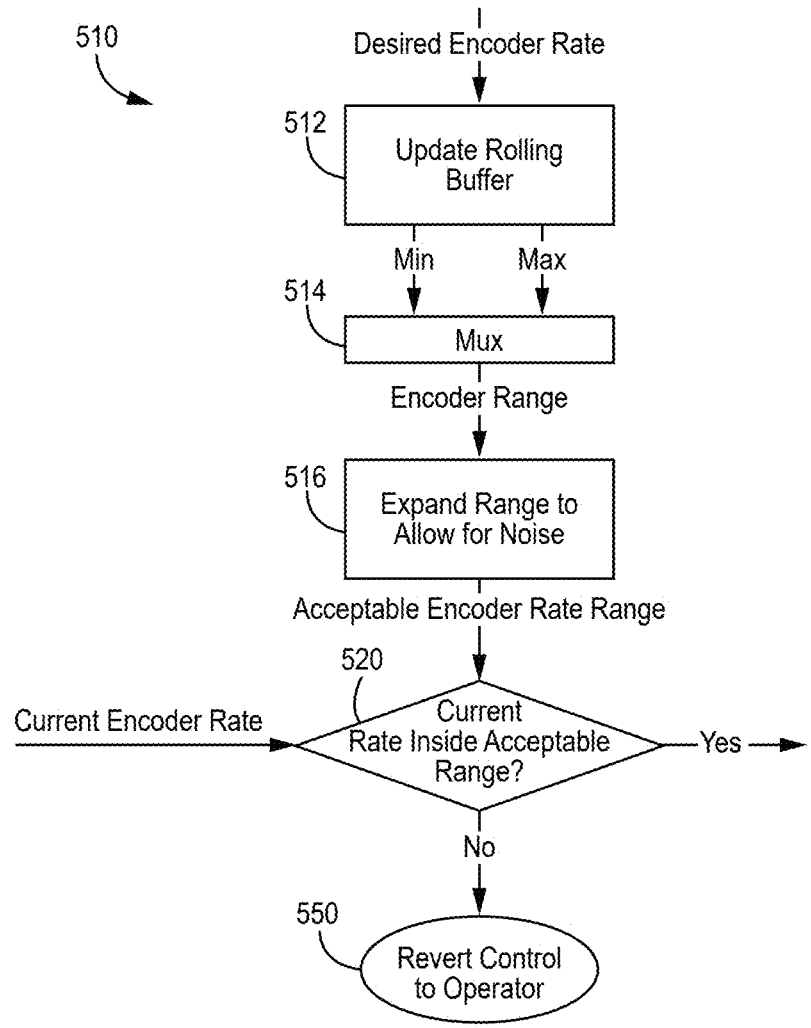
FIG. 7 is a flow diagram illustrating operation of an automatic steering system according to an implementation.

FIG. 7 depicts one example of comparing the current steering rate with desired steering rate information that includes a history of desired steering rates according to various implementations. FIG. 7 depicts part of a kickout process 1510 that generates a desired or acceptable range of target steering rates and then determines 1520 whether the current steering rate is within the range of desired steering rates. A determination that the current steering rate is not inside (i.e., outside) the acceptable range is an indication that manual steering control may be desired and the system reverts steering control 1550 to the operator. In contrast, a determination that the current steering rate is within the acceptable range indicates that automatic steering should continue.

An acceptable range of desired or targeted steering rates can be generated in various suitable manners according to the implementations disclosed and contemplated by this disclosure. In the implementation depicted in FIG. 7, the automatic steering system updates 1512 a rolling buffer with new desired steering rates as they are received. In various cases the buffer contains the last twenty desired steering rates. The buffer can collect a larger or smaller number of rates in various implementations. In some cases an expected range of steering rates is then determined 1514 using the maximum and minimum rates in the buffer.

In some implementations the range of steering rates is expanded 1516 by some amount to provide tolerance for system noise. As an example, the minimum rate of the range may be lowered by some amount and/or the maximum rate of the range may be increased by some amount. According to various implementations, the maximum rate is increased by 10% of its value and the minimum rate is lowered by 10% of its value. Different amounts of tolerance can be used depending upon the requirements or preferences of a particular implementation. Further implementations are of course possible, regardless of limitations on controller rate, length of the rolling buffer, minimum tolerance or otherwise.

Once the steering system has generated an expected range of acceptable steering rates, the system determines 1520 whether the current steering rate is within the acceptable range and either maintains automatic control or reverts to manual control as noted above.

Figure 8:
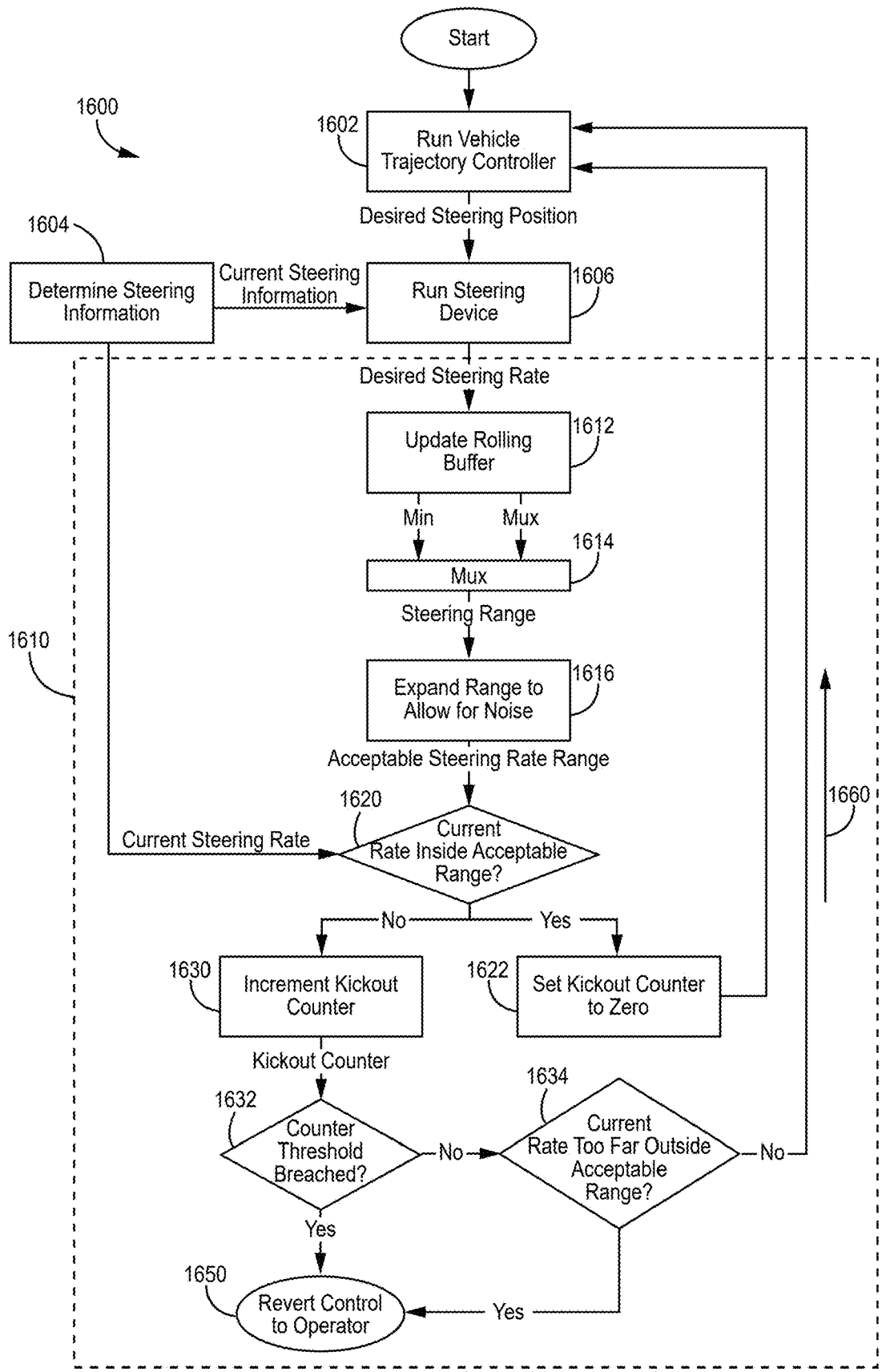
FIG. 8 is a flow diagram illustrating operation of an automatic steering system according to an implementation.

FIG. 8 is a flow diagram illustrating operation 1600 of another automatic steering system according to various implementations. As with other examples described herein, the automatic steering system includes running 1602 a vehicle trajectory controller to generate a desired steering position for adjusting the steering of the vehicle. The steering system also determines 1604 steering information (e.g., with a steering sensor) to determine the current steering position. The desired steering position and one or both of the current steering position and current steering rate are then used to run 1606 a steering device to change the vehicle's steering trajectory. In various implementations one or both of the current steering position and current steering rate and the desired steering position are used to determine a desired steering rate for adjusting the vehicle's steering. In some cases running the vehicle trajectory controller, determining steering information, and running the steering device are carried out in the same manner as the system operation 1300 described with respect to FIG. 6.

The steering system operation also includes a kickout process or procedure 1610 that determines whether to give manual control 1650 to an operator or to loop back 1660 to continue automatic steering control by running 1602 the vehicle trajectory controller. As with the example of FIG. 7, the kickout process 1610 includes generating an acceptable range of target steering rates and then determining 1620 whether the current steering rate is within the acceptable range. To generate the acceptable range of steering rates, the automatic steering system determines 1614 the maximum and minimum rates from a rolling buffer 1612 of desired steering rates and then expands 1616 the range by some amount to provide tolerance for system noise.

As discussed elsewhere, determining that the current steering rate is outside the desired steering range may indicate that control should revert to manual steering. In some cases, it may be desirable delay the switch to manual control in order to, for example, confirm the determination to disengage automatic control. As an example, in some implementations steering control is switched to a manual mode only after detecting multiple subsequent instances of the current steering rate being outside the acceptable steering range. The example kickout process 1610 in FIG. 8 includes incrementing 1630 a kickout counter each time the current steering rate is outside the acceptable range of steering rates. Upon exceeding a counter threshold 1632, the steering system reverts control 1650 to the operator.

According to various implementations, the counter threshold 1632 can be set by the operator running the system. In some cases setting the counter threshold to a low value allows for easily and quickly switching to manual steering control. In some implementations a higher value for the counter threshold results in a longer kickout time but may result in fewer false kickouts. In some cases false kickouts occur when the steering wheel is bumped or an operator rests their hand on the wheel. In some cases field conditions bump the vehicle wheels. The movement can at times feed back into the steering column and be falsely interpreted by the system as the operator moving the steering wheel.

In some cases the counter threshold 1632 can be fixed to require any number of kickouts suitable for a particular operating environment. In implementations such as those discussed above, an operator can set the counter threshold 1632 to a value within a predefined range. In some cases the counter threshold can be any suitable value from a single instance to 50 or 100 or more instances. It should be appreciated as well that the desirable number for the threshold may depend upon the operating frequency of the system. In some cases the threshold can be set to a number from 3 to 43, which corresponds to a time range of 0.06 seconds up to 0.8 seconds when operating at 50 Hz.

As already noted, in some cases implementations of an automatic steering system will maintain automatic steering control, loop back to running the vehicle trajectory controller, and then conduct a new kickout analysis with updated steering rates. For example, FIG. 8 illustrates how the steering system operation loops back 1660 to running the vehicle trajectory controller 1602 in certain circumstances. The kickout process 1610 illustrates two situations in which automatic control is maintained in this way. In some cases the kickout process may determine 1620 that the current steering rate is actually within the acceptable range of desired steering rates. Under these circumstances, the automatic steering system sets the kickout counter to zero 1622 and operational control flows back 1660 to running the vehicle trajectory controller 1602.

As another example, in some implementations a kickout process 1610 further considers the degree to which a current steering rate is outside the acceptable range of rates. In the example shown in FIG. 8, if the kickout counter is incremented 1630 and the counter threshold is not surpassed 1632, the system moves on to evaluating 1634 how far the current rate is outside the acceptable range of rates. For example, the system may determine the difference between the current steering rate and the max or min of the acceptable range. When the difference in rates exceeds a particular threshold, the steering system reverts control 1650 to the operator. On the other hand, automatic steering control is maintained if the difference in rates does not exceed the difference threshold. In such cases operational control flows back 1660 to running the vehicle trajectory controller 1602 and awaiting a new kickout analysis 1610.

According to various implementations, the threshold for evaluating the steering rate difference may be fixed or adjustable. In some cases the threshold has a default steering value that corresponds to 0.6 revolutions of the steering wheel per second.

As previously discussed, an operator may in some implementations determine the conditions or criteria for a kickout of automatic steering control. For example, an operator may select the value at which the kickout occurs based on a desired sensitivity for the kickout analysis. In some cases the kickout sensitivity is time based. For example, in some implementations a kickout system is based on the number of reported or current steering rates falling outside the expected range. In some cases the steering sensor reports its current steering rate at a fixed interval, thus making the kickout methodology time based. Accordingly, requiring more current steering rates to fall outside the expected range before kicking out decreases the kickout sensitivity by increasing the time required to kickout. Conversely, increasing the kickout sensitivity decreases the time to kick out.

Figure 9:
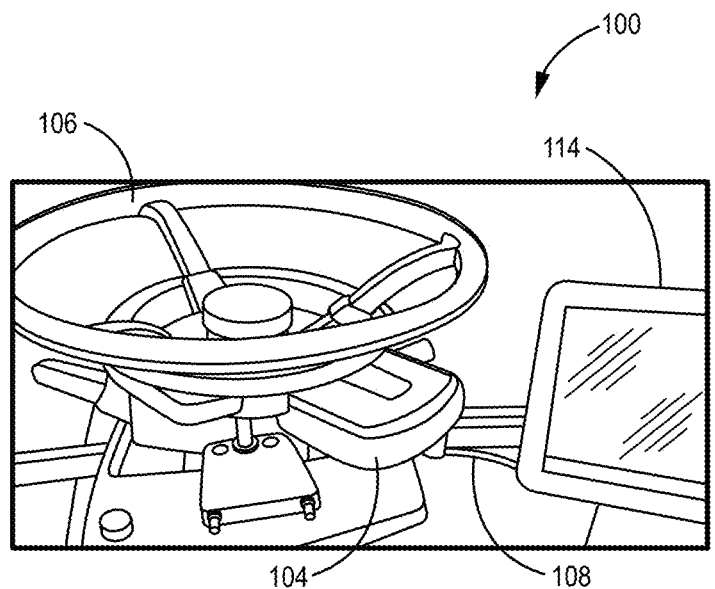
FIG. 9 is a perspective view of an automatic steering system mounted to a steering wheel of an agricultural vehicle according to an implementation.

FIG. 9 is a perspective view of another automatic steering system 100, mounted within a vehicle according to an embodiment. As depicted in this particular example, the automatic steering system 100 includes a display unit 114 and an assisted steering device 104 mounted to the steering wheel 106 of the vehicle. A communications link 108 connects the assisted steering device 104 to the display unit 114 and a controller housed within. It should be appreciated that the controller may be located in one of many places according to various implementations. For example, in some cases the controller is a discrete physical component mounted separately from other components. In some cases the controller is mounted within and/or is integral to another component, such as the display unit 114, the assisted steering device 104, or another component.

According to various implementations, the controller (not shown in FIG. 9) is configured to determine a desired trajectory and control the assisted steering device 104 to steer the vehicle along the desired trajectory. As an example, in some cases the controller is configured to determine a vehicle curvature that will guide the vehicle from its current position to a new position along the desired trajectory. In various implementations the controller determines the vehicle curvature as a desired steering angle or steering wheel position. A controller is configured to then determine a turning rate (e.g., in terms of speed and direction) to bring the steering wheel from its current position to the desired position within a particular amount of time. It is appreciated that in various implementations, one or more controller is provided.

According to various implementations, the assisted steering device 104 includes a motor drive unit (MDU) with a drive motor configured to rotate the steering wheel in response to commands from the controller. The MDU also includes a motor encoder that senses rotation of the motor using, for example, a Hall-effect sensor. The MDU generates and sends a feedback signal to the controller based on the sensor output. In various implementations the feedback signal includes the current encoder position and the current encoder rate. According to such implementations, the current encoder position corresponds to the current position of the motor and steering wheel and the current encoder rate corresponds to the speed and direction of the motor/steering wheel. In various implementations the controller also sends steering commands to the MDU in the form of desired encoder positions and/or rates. For example, in various cases the controller sends a desired encoder rate to the MDU to bring the encoder and the steering wheel from their current positions to new desired positions corresponding to a desired vehicle curvature.

In some cases, the current encoder rate is determined as a number of encoder counts per second. According to various implementations, the encoder has approximately 850 counts for one revolution of the steering wheel. In some such cases, the controller directs the MDU to adjust steering at up to a maximum rate of +/−1.5 revolutions (i.e., 1275 counts) per second, with the sign indicating whether to turn clockwise or counterclockwise. Further implementations are of course possible, regardless of limitations on max turning rate and how many counts there are per revolution.

In some implementations, the MDU may include additional features, characteristics, and capabilities known in the art. In various implementations the assisted steering device 104 is similar to or the same as one or more of the steering devices disclosed in U.S. application Ser. No. 16/921,828, entitled "Assisted Steering Apparatus and Associated Systems and Methods," filed Jul. 6, 2020, the entire content of which is hereby incorporated herein by reference. Those skilled in the art will further understand various methods and techniques for determining a desired trajectory and corrective steering angle. In some cases the controller may implement one or more techniques as taught in U.S. App. No. and in U.S. 63/026,208, entitled "Apparatus, Systems and Methods for Automatic Steering Guidance and Visualization of Guidance Paths," filed May 18, 2020, the entire content of which is hereby incorporated herein by reference.

Figure 10:
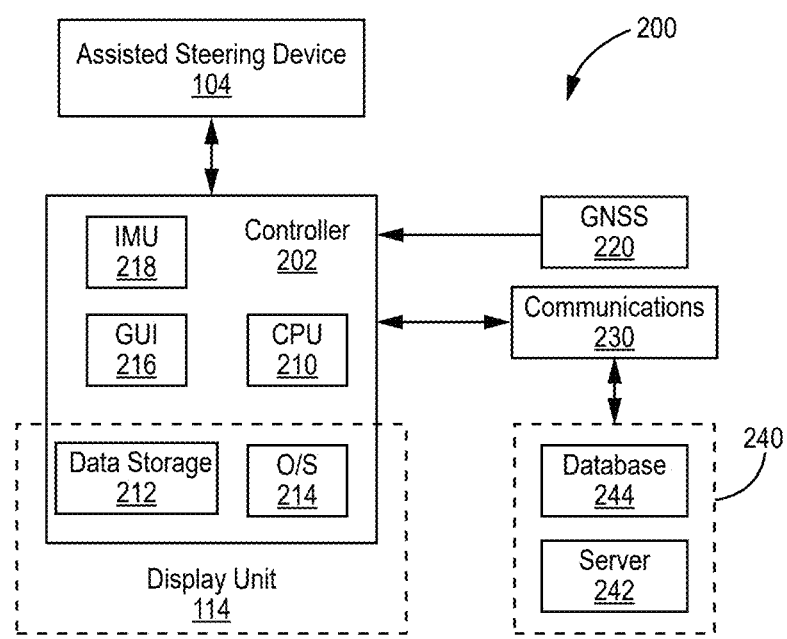
FIG. 10 is a system diagram of an automatic steering system according to an implementation.

FIG. 10 is a system diagram providing further detail about one example of an automatic steering system 200 according to various implementations. Like the system 100 depicted in FIG. 9, the automatic steering system 200 includes a controller 202 in communication with an assisted steering device 104. The assisted steering device 104 is configured to be mounted to a vehicle steering wheel (e.g., as shown in FIG. 9) and to move the wheel in response to commands received from the controller 202.

In the depicted example, the controller 202 is operationally integrated with a display unit 114. One example of a suitable display unit is the display unit sold under the name InCommand® by Ag Leader Technology of Ames, Iowa. It is appreciated that certain of these displays 114 may include touchscreens, while others are equipped with interface components such as a keyboard, mouse, and/or other device for interacting with the system 200.

According to various implementations, the controller 202 includes one or more processing and computing components for implementing various technologies disclosed herein and elsewhere. As shown in FIG. 10, some of the components of the controller 202 can include a CPU or processor 210, data storage 212, an operating system 214, and a graphical user interface (GUI) 216 accessible through, e.g., the display unit 114. In this example the controller 202 also includes an optional inertial measurement unit (IMU) 218. It should be appreciated that the various system components are in operational communication with one another via wired or wireless connections and are configured to perform processes and execute commands to implement operations and features described herein.

In various implementations, the automatic steering system 200 is also operationally integrated with a GNSS or GPS unit 220, such as a GPS 7500, such that the system 200 is configured to input positional data for use in defining boundaries, locating the vehicle, plotting guidance, and the like, as will be readily appreciated. As an example, in some cases the controller 202 is configured to determine (e.g., estimate) the current position and/or trajectory of the vehicle using data from the GNSS/GPS unit 220 and/or the IMU 218.

In various implementations the system 200 also includes a communications component 230 configured for sending and receiving data to one or more cloud-based locations 240 for processing and storage. As examples, data may be transmitted to and from a remote server 242, database 244, and/or other cloud computing components readily understood in the art. Such connections by the communications component 230 can be made wirelessly via understood internet and/or cellular technologies such as Bluetooth, Wi-Fi, LTE, 3G, 4 G, or 5 G connections and the like. It is understood that in certain implementations, the communications component 230 and/or cloud 240 components comprise encryption or other data privacy components such as hardware, software, and/or firmware security aspects. In various implementations, the operator or enterprise manager or other third parties are able to receive notifications such as adjustment prompts and confirmation screens on their mobile devices, and in certain implementations can review the plotted guidance paths and make adjustments via their mobile phones.

Figure 11:
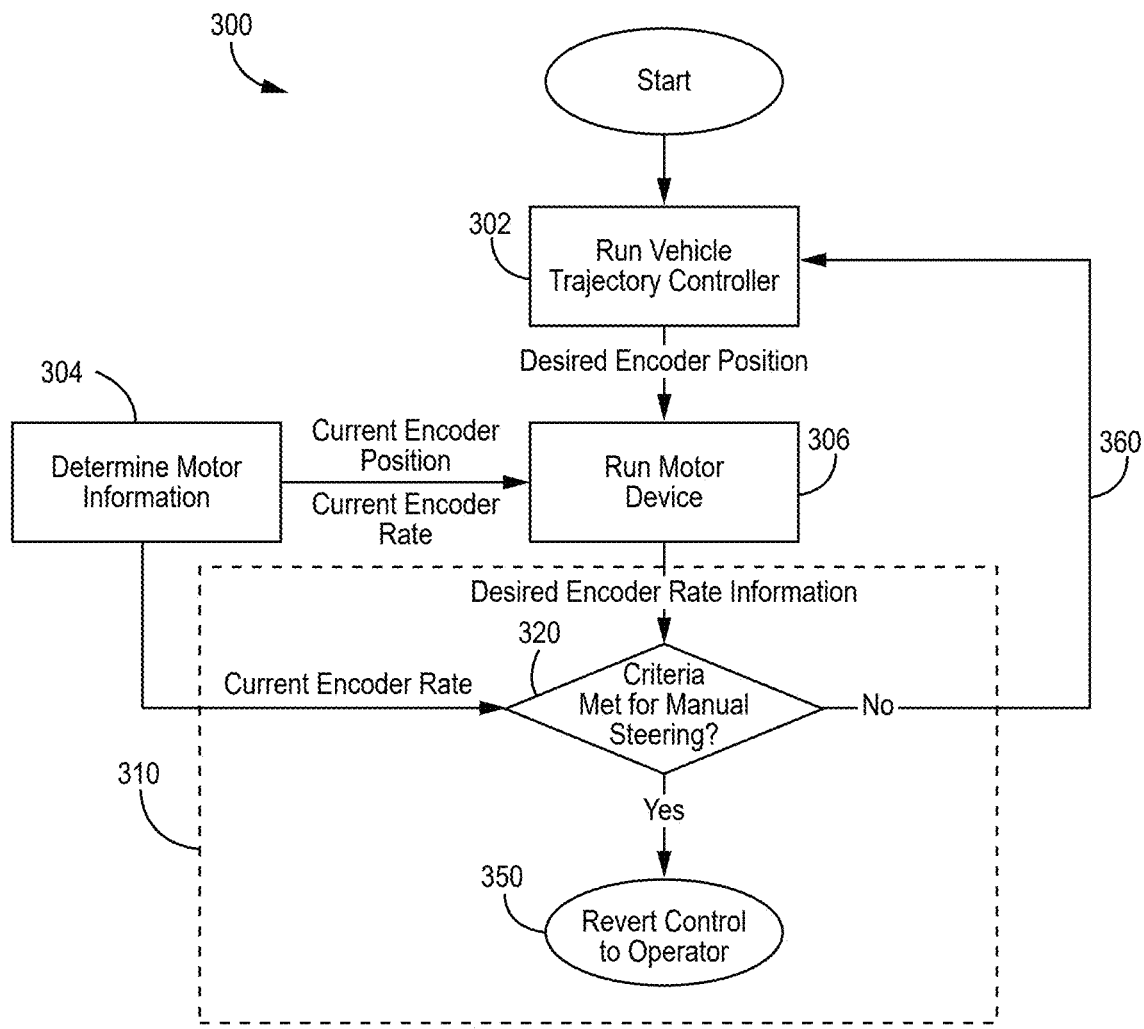
FIG. 11 is a flow diagram illustrating operation of an automatic steering system according to an implementation.

FIG. 11 is a flow diagram illustrating operation 300 of an automatic steering system according to various implementations. Among other things, the automatic steering system's operation includes running 302 a vehicle trajectory controller to generate a desired encoder position for adjusting the steering of a vehicle. The desired encoder position may correspond to, for example, a steering wheel position that will result in a particular steering curvature. As shown in FIG. 11, the steering system also determines 304 motor information. In some cases, a motor drive unit of the system measures various properties and reports the information. In various implementations the determined motor information includes current encoder information. In some cases the current encoder information includes a current encoder position, a current encoder rate, or both. The desired encoder position is then used along with one or both of the current encoder rate and the current encoder position to run 306 a motor controller, which operates a steering motor to change the vehicle's steering trajectory. As an example, in some cases the desired encoder position is used along with one or both of the current encoder position and current encoder rate to determine a desired encoder rate for moving the encoder (and steering wheel) to the desired position.

In the depicted implementation, the operation of the automatic steering system includes a kickout analysis or process 310 that determines whether to disengage automatic steering control of the vehicle. In general, the kickout process 310 includes analyzing 320 a current encoder rate and desired encoder rate information. In various implementations, the desired encoder rate information is based on the desired encoder position and one or both of the current encoder position and current encoder rate. As an example, in some cases the desired encoder rate information includes a desired encoder rate generated to run 306 the motor controller as previously discussed. In some cases the desired encoder rate information may be based on additional processing of a desired encoder rate and may include, for example, a history of desired encoder rates.

When the analysis determines that condition(s) for manual steering control are met, the automatic steering is disengaged and control reverts 350 to the operator. In some circumstances the analysis 320 may instead determine that manual steering criteria are not met. In these cases the operational flow loops back 360 to continue automatic steering control by running 302 the vehicle trajectory controller until a subsequent kickout routine 310 begins. It will be appreciated that in various implementations the analytical logic may be switched while retaining the same substantive analysis. For example, in some cases the analysis may instead ask if condition(s) for automatic steering control are met, with a true answer leading to the continuation of automatic steering control and a false answer leading to manual steering control.

According to various implementations, the automatic steering operation 300 is carried out by an automatic steering system such as one of the systems 100, 200 shown in FIGS. 9 and 10, respectively. In such cases the steering system controller(s) operate(s) as one or both of the motor controller and trajectory controller in FIG. 11. In various implementations, one or more controllers are provided to accomplish the functionality described herein, as would be appreciated.

In some cases the steering system controller also determines 320 if manual steering conditions or criteria are met and reverts control 350 to the operator or loops control back 360 to the vehicle trajectory controller process 302. According to various implementations, one or more additional controllers may carry out portions of the operation 300. As just one example, in some cases an entirely separate vehicle trajectory controller determines the vehicle's position and generates a desired encoder position for correcting the vehicle's trajectory.

Various criteria, conditions, and/or analyses are used to evaluate the current encoder rate and the desired encoder rate information (e.g., desired encoder rate) in various implementations. As an example, in some cases the steering system evaluates the desired encoder rate information and the current encoder rate to determine how the vehicle's steering is tracking with the trajectory determined by the vehicle trajectory controller. In some cases differences between the desired and current encoder rates indicate that an operator is holding the steering wheel and/or overriding the automatic steering by physically turning the steering wheel. In such cases the system disengages the automatic steering control and reverts control 350 to the operator.

Figure 12:
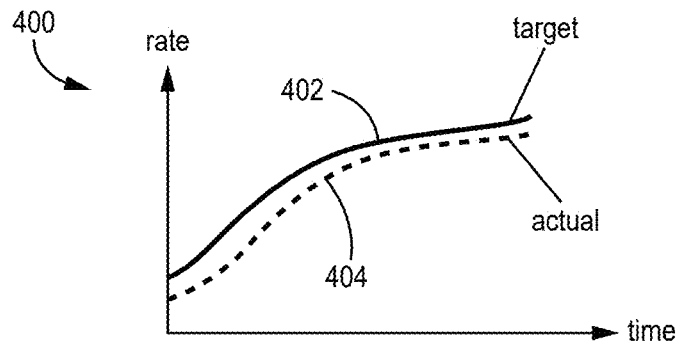
FIG. 12 is a graph comparing plots of targeted and actual encoder rates according to various implementations.

In some cases a lag exists between determining a desired encoder position and desired encoder rate and the steering motor responding accordingly. FIG. 12 is a graph 400 depicting plots of a desired or target encoder rate 402 and a current or actual encoder rate 404 according to various embodiments. As can be seen, the shape of the actual encoder rate 404 curve generally conforms to the target encoder rate 402 curve, but is shifted or delayed in time by some amount. Various implementations of an automatic steering system address such a lag by comparing a current encoder rate with desired encoder rate information that includes a history of desired encoder rates. Such an analysis enables the steering system to determine if the encoder rates reported from the motor are tracking in the expected direction.

Figure 13:
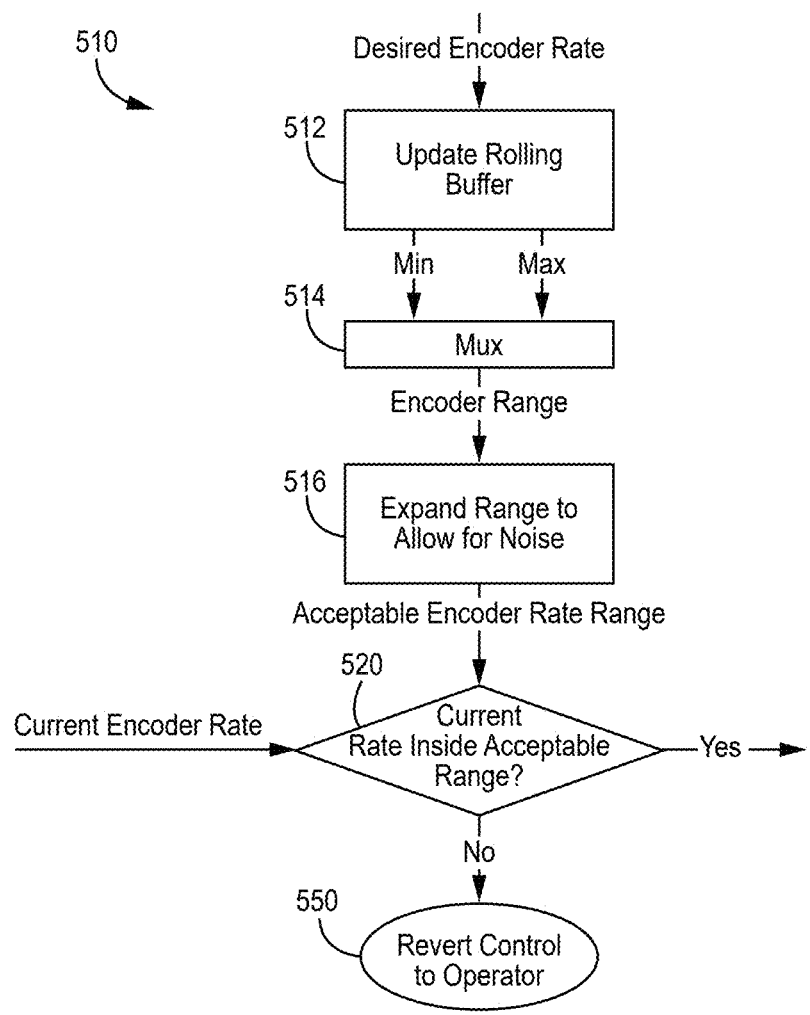
FIG. 13 is a flow diagram illustrating operation of an automatic steering system according to an implementation.

FIG. 13 depicts one example of comparing the current encoder rate with desired encoder rate information that includes a history of desired encoder rates according to various implementations. FIG. 13 depicts part of a kickout process 510 that generates a desired or acceptable range of target encoder rates and then determines 520 whether the current encoder rate is within the range of desired encoder rates. A determination that the current encoder rate is not inside (i.e., outside) the acceptable range is an indication that manual steering control may be desired and the system reverts steering control 550 to the operator. In contrast, a determination that the current encoder rate is within the acceptable range indicates that automatic steering should continue.

An acceptable range of desired or targeted encoder rates can be generated in various suitable manners according to the implementations disclosed and contemplated by this disclosure. In the implementation depicted in FIG. 13, the automatic steering system updates 512 a rolling buffer with new desired encoder rates as they are received from the motor controller. In various cases the buffer contains the last twenty desired encoder rates, which corresponds to values over the last 0.4 seconds when the controller is run at 50 Hz. The buffer can collect a larger or smaller number of rates in various implementations. In some cases an expected range of encoder rates is then determined 514 using the maximum and minimum rates in the buffer.

In some implementations the range of encoder rates is expanded 516 by some amount to provide tolerance for system noise. As an example, the minimum rate of the range may be lowered by some amount and/or the maximum rate of the range may be increased by some amount. According to various implementations, the maximum rate is increased by 10% of its value and the minimum rate is lowered by 10% of its value. Different amounts of tolerance can be used depending upon the requirements or preferences of a particular implementation. In some cases a minimum tolerance of at least 50 encoder counts per second is used. As an example, a range minimum of −10 counts per second would result in a tolerance-adjusted minimum of −60 counts per second due to the 50 count per second minimum difference. Further implementations are of course possible, regardless of limitations on controller rate, length of the rolling buffer, minimum tolerance or otherwise.

Once the steering system has generated an expected range of acceptable encoder rates, the system determines 520 whether the current encoder rate is within the acceptable range and either maintains automatic control or reverts to manual control as noted above.

Figure 14:
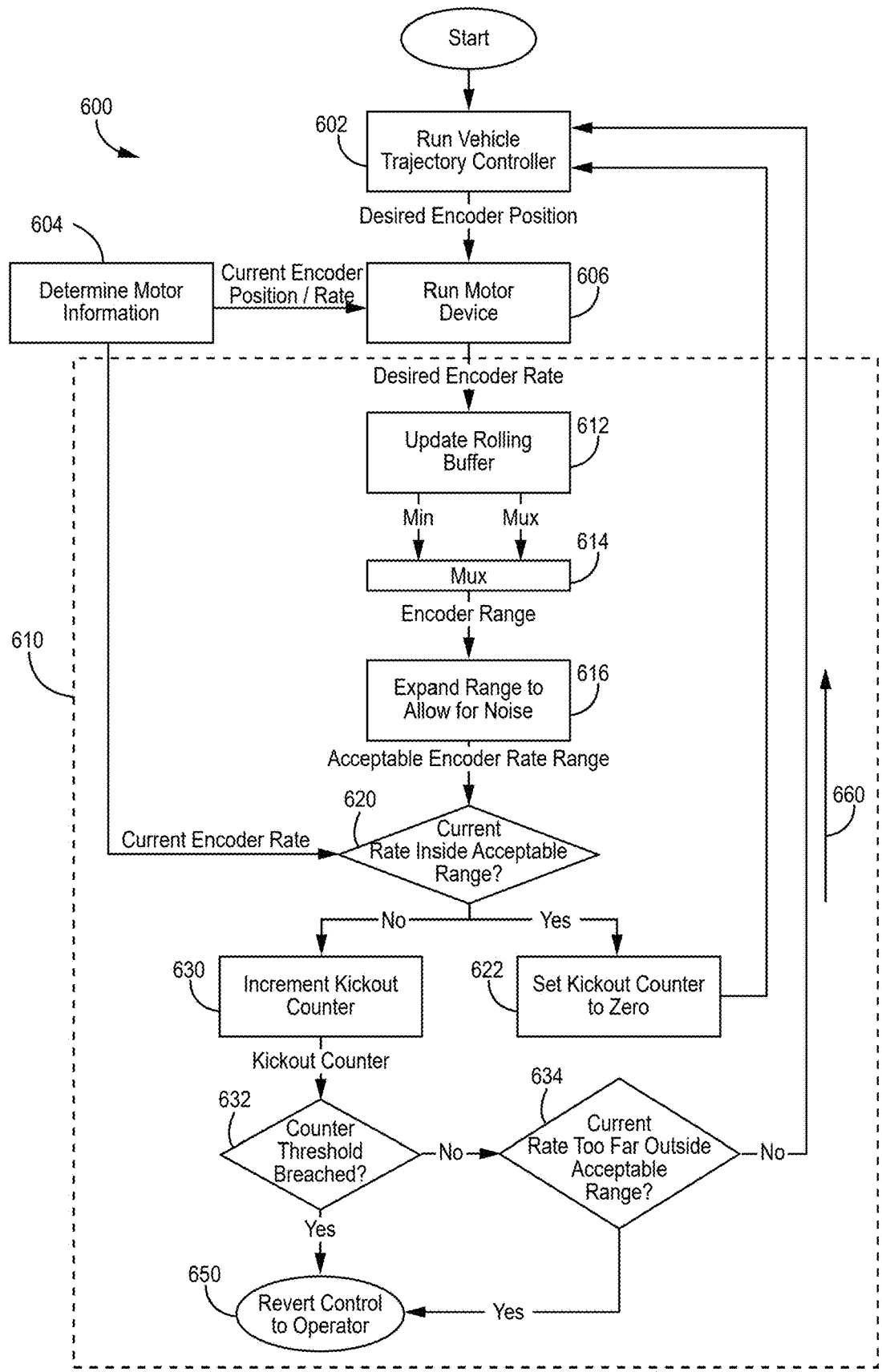
FIG. 14 is a flow diagram illustrating operation of an automatic steering system according to an implementation.

FIG. 14 is a flow diagram illustrating operation 600 of another automatic steering system according to various implementations. As with other examples described herein, the automatic steering system includes running 602 a vehicle trajectory controller to generate a desired encoder position for adjusting the steering of the vehicle. The steering system also determines 604 motor information to determine the current encoder position. The desired encoder position and one or both of the current encoder position and current encoder rate are then used to run 606 a motor controller, which operates a steering motor to change the vehicle's steering trajectory. In various implementations one or both of the current encoder position and current encoder rate and the desired encoder position are used to determine a desired encoder rate for adjusting the vehicle's steering. In some cases running the vehicle trajectory controller, determining motor information, and running the motor controller are carried out in the same manner as the system operation 300 described with respect to FIG. 11.

The steering system operation also includes a kickout process or procedure 610 that determines whether to give manual control 650 to an operator or to loop back 660 to continue automatic steering control by running 602 the vehicle trajectory controller. As with the example of FIG. 13, the kickout process 610 includes generating an acceptable range of target encoder rates and then determining 620 whether the current encoder rate is within the acceptable range. To generate the acceptable range of encoder rates, the automatic steering system determines 614 the maximum and minimum rates from a rolling buffer 612 of desired encoder rates and then expands 616 the range by some amount to provide tolerance for system noise.

As discussed elsewhere, determining that the current encoder rate is outside the desired encoder range may indicate that control should revert to manual steering. In some cases, it may be desirable delay the switch to manual control in order to, for example, confirm the determination to disengage automatic control. As an example, in some implementations steering control is switched to a manual mode only after detecting multiple subsequent instances of the current encoder rate being outside the acceptable encoder range. The example kickout process 610 in FIG. 14 includes incrementing 630 a kickout counter each time the current encoder rate is outside the acceptable range of encoder rates. Upon exceeding a counter threshold 632, the steering system reverts control 650 to the operator.

According to various implementations, the counter threshold 632 can be set by the operator running the system. In some cases setting the counter threshold to a low value allows for easily and quickly switching to manual steering control. In some implementations a higher value for the counter threshold results in a longer kickout time but may result in fewer false kickouts. In some cases false kickouts occur when the steering wheel is bumped or an operator rests their hand on the wheel. In some cases field conditions bump the vehicle wheels. The movement can at times feed back into the steering column and be falsely interpreted by the system as the operator moving the steering wheel.

In some cases the counter threshold 632 can be fixed to require any number of kickouts suitable for a particular operating environment. In implementations such as those discussed above, an operator can set the counter threshold 632 to a value within a predefined range. In some cases the counter threshold can be any suitable value from a single instance to 50 or 100 or more instances. It should be appreciated as well that the desirable number for the threshold may depend upon the operating frequency of the system. In some cases the threshold can be set to a number from 3 to 43, which corresponds to a time range of 0.06 seconds up to 0.8 seconds when operating at 50 Hz.

As already noted, in some cases implementations of an automatic steering system will maintain automatic steering control, loop back to running the vehicle trajectory controller, and then conduct a new kickout analysis with updated encoder rates. For example, FIG. 14 illustrates how the steering system operation loops back 660 to running the vehicle trajectory controller 602 in certain circumstances. The kickout process 610 illustrates two situations in which automatic control is maintained in this way. In some cases the kickout process may determine 620 that the current encoder rate is actually within the acceptable range of desired encoder rates. Under these circumstances, the automatic steering system sets the kickout counter to zero 622 and operational control flows back 660 to running the vehicle trajectory controller 602.

As another example, in some implementations a kickout process 610 further considers the degree to which a current encoder rate is outside the acceptable range of rates. In the example shown in FIG. 14, if the kickout counter is incremented 630 and the counter threshold is not surpassed 632, the system moves on to evaluating 634 how far the current rate is outside the acceptable range of rates. For example, the system may determine the difference between the current encoder rate and the max or min of the acceptable range. When the difference in rates exceeds a particular threshold, the steering system reverts control 650 to the operator. On the other hand, automatic steering control is maintained if the difference in rates does not exceed the difference threshold. In such cases operational control flows back 660 to running the vehicle trajectory controller 602 and awaiting a new kickout analysis 610.

According to various implementations, the threshold for evaluating the encoder rate difference may be fixed or adjustable. In some cases the threshold has a default value of 500 encoder counts per second, which corresponds to 0.6 revolutions of the steering wheel per second.

As previously discussed, an operator may in some implementations determine the conditions or criteria for a kickout of automatic steering control. For example, an operator may select the value at which the kickout occurs based on a desired sensitivity for the kickout analysis. In some cases the kickout sensitivity is time based. For example, in some implementations a kickout system is based on the number of reported or current encoder rates falling outside the expected range. In some cases the motor reports its current encoder rate at a fixed interval, thus making the kickout methodology time based. Accordingly, requiring more current encoder rates to fall outside the expected range before kicking out decreases the kickout sensitivity by increasing the time required to kickout. Conversely, increasing the kickout sensitivity decreases the time to kick out.

FIGS. 15-18 are graphs illustrating targeted and actual encoder rates in various circumstances according to some implementations. As previously discussed, in some implementations a determination that a current encoder rate is outside the acceptable range is an indication that manual steering control may be desired. In some cases the steering system may revert steering control to the operator as a result. In contrast, a determination that the current encoder rate is within the acceptable range indicates that automatic steering should continue.

Figure 15:
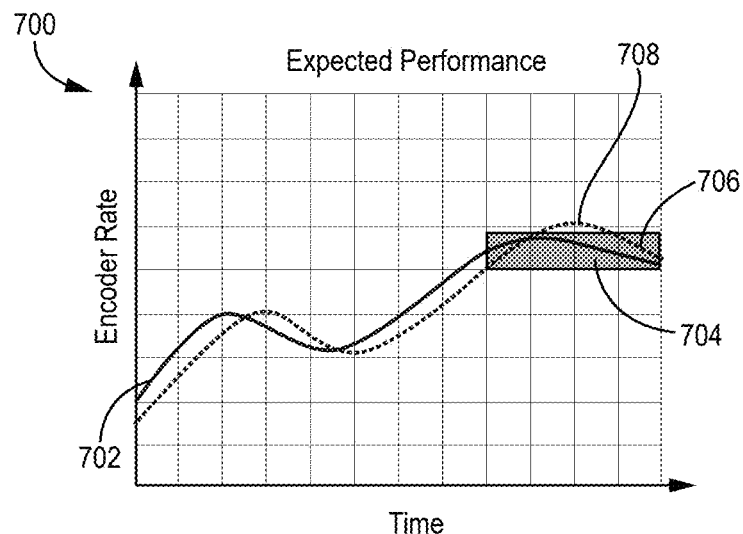
FIGS. 15-18 are graphs comparing plots of targeted and actual encoder rates according to various implementations.

FIG. 15 is a graph 700 depicting a plot of a target encoder rate 702 and an acceptable range of encoder rates 704. In various implementations, the acceptable range of encoder rates 704 corresponds to a specific target encoder rate, and thus the acceptable range 704 will shift along with the target rate. Also shown is a plot of a current, or actual, encoder rate 706 reported by a steering system motor encoder. According to various implementations, the extent of the acceptable range of encoder rates 704 is determined based on one or more preset criteria. For example, in some cases the acceptable range 704 has a length of time defined by a rolling buffer such as described with respect to FIG. 13. In some cases the minimum and maximum rates for the range 704 are centered about the value of the target rate by a preset amount. In some cases the minimum and maximum rates include a tolerance adjustment as previously discussed.

As seen in the graph 700, the actual encoder rate 706 stays relatively close to the target encoder rate 702 over time, including within the acceptable encoder rate range 704. In some implementations this is expected performance of the steering system and thus automatic control would be maintained. It can further be seen that the actual encoder rate 706 rises above the acceptable range around time 708. According to some implementations, the deviation from the acceptable range would increment a kickout counter as described with respect to FIG. 14. Exceeding a threshold count of rate deviations causes steering control to switch to the operator in various cases.

Figure 16:
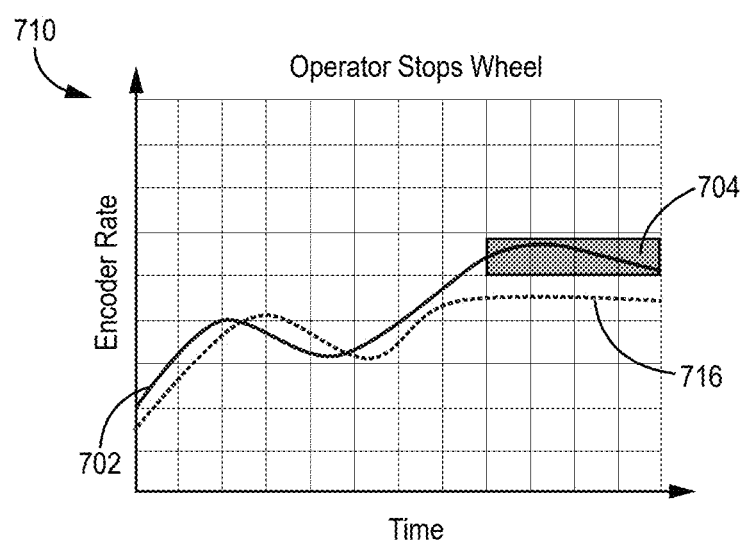
Figure 17:
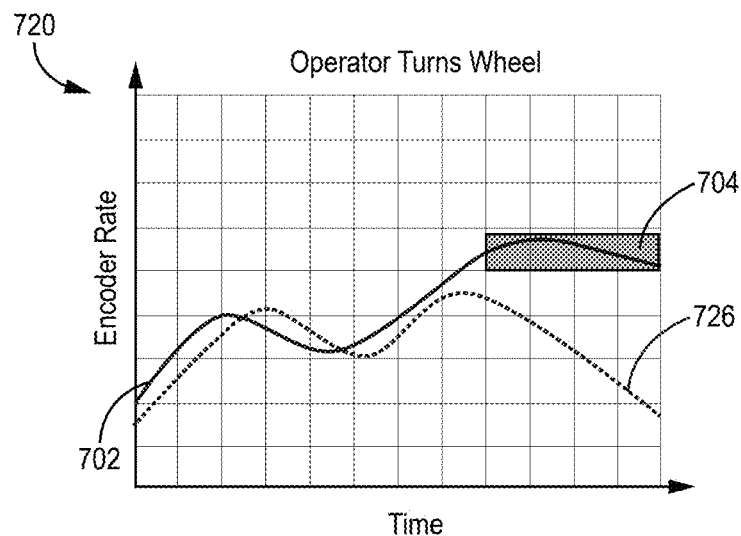
Figure 18:
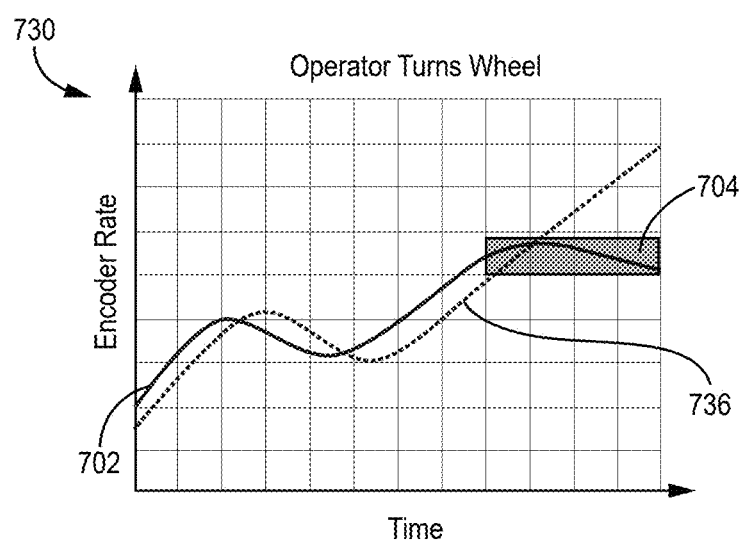

Turning to FIGS. 16-18, plots of target and actual encoder rates are illustrated in graphs 710, 720, and 730, respectively. As can be seen, each graph illustrates a case in which the actual encoder rate deviates from the target encoder rate and the acceptable rate range 704. In FIG. 16 the actual encoder rate 716 remains constant for a time, which in various cases indicates that the operator has stopped the steering wheel. In FIGS. 17 and 18, the target rates 726, 736 deviate below and above, respectively, the acceptable range 704, indicating that the operator has turned the steering wheel in various implementations.

Although the disclosure has been described with reference to preferred embodiments, persons skilled in the art will recognize that changes may be made in form and detail without departing from the spirit and scope of the disclosed apparatus, systems and methods.

What is claimed is:

1. An automatic steering system for a vehicle, comprising:
an assisted steering device configured to mount to a steering wheel of a vehicle, the assisted steering device comprising a motor and an encoder, wherein the motor is offset from a steering axis of the vehicle's steering wheel when mounted, the assisted steering device further configured to determine current encoder information; and
a controller configured to operate the assisted steering device, the operation comprising:
receiving the current encoder information from the assisted steering device;
determining a desired encoder rate based on the current encoder information and a desired encoder position;
operating the motor using the desired encoder rate;
comparing a current encoder rate to desired encoder rate information; and
disengaging automatic steering control when a result of the comparison meets a manual steering condition.

2. The automatic steering system of claim 1, wherein the desired encoder rate information comprises an acceptable encoder rate range.

3. The automatic steering system of claim 2, wherein the acceptable encoder rate range is based on a history of the desired encoder rate.

4. The automatic steering system of claim 2, wherein the manual steering condition comprises the current encoder rate being outside the acceptable encoder rate range.

5. The automatic steering system of claim 4, wherein the manual steering condition further comprises the current encoder rate being outside the acceptable encoder rate range for a number of consecutive comparisons exceeding a counter threshold.

6. The automatic steering system of claim 4, wherein the manual steering condition further comprises the current encoder rate being outside the acceptable encoder rate range by a difference exceeding a difference threshold.

7. The automatic steering system of claim 1, wherein the current encoder information comprises a current encoder position.

8. The automatic steering system of claim 1, wherein the current encoder information comprises the current encoder rate.

9. An automatic steering system for an agricultural vehicle, comprising:
a steering sensor configured to mount to an agricultural vehicle with an assisted steering device and provide a feedback signal comprising vehicle steering information for automatically controlling the assisted steering device; and
a controller operably coupled to the steering sensor and configured to:
receive the feedback signal and current steering information from the steering sensor;
determine desired steering rate information based on the current steering information and a desired steering position;
compare a current steering rate to the desired steering rate information; and
disengage automatic steering control based on comparing the current steering rate to the desired steering rate information;
wherein the assisted steering device comprises a motor and an encoder and is configured to mount to a steering wheel of the agricultural vehicle such that the motor is offset from a steering axis of the steering wheel.

10. The automatic steering system of claim 9, wherein the controller is further configured to update a counter based on comparing the current steering rate to the desired steering rate information and disengage the automatic steering control when the counter exceeds a counter threshold.

11. The automatic steering system of claim 9, wherein the controller is further configured to determine a difference between the current steering rate and the desired steering rate information and disengage the automatic steering control when the difference exceeds a difference threshold.

12. The automatic steering system of claim 9, wherein the desired steering rate information comprises a desired steering rate for operating the steering device.

13. The automatic steering system of claim 9, wherein the desired steering rate information comprises an acceptable steering rate range.

14. The automatic steering system of claim 13, wherein the controller is further configured to determine the acceptable steering rate range based on a history of a desired steering rate for operating the steering device.

15. The automatic steering system of claim 9, wherein
the controller is operably coupled to the assisted steering device,
the steering sensor comprises the encoder,
the current steering information comprises current encoder information,
the desired steering rate information comprises desired encoder rate information, and
the current steering rate comprises a current encoder rate.

16. A method for steering an agricultural vehicle, comprising:
steering the agricultural vehicle with an assisted steering device comprising a motor and an encoder, the assisted steering device being mounted to a steering wheel of the vehicle with the motor offset from a steering axis of the steering wheel;
receiving a feedback signal comprising current steering information with a controller configured to operate the assisted steering device;
comparing the current steering information to desired steering information; and disengaging automatic steering control when a result of the comparison meets a manual steering condition.

17. The method of claim 16,
further comprising receiving the feedback signal from the assisted steering device;
wherein the current steering information comprises a current encoder rate; and
wherein the desired steering information comprises an acceptable encoder rate range.

18. The method of claim 17, wherein the manual steering condition comprises the current encoder rate being outside the acceptable encoder rate range.

19. The method of claim 18, wherein the manual steering condition further comprises the current encoder rate being outside the acceptable encoder rate range for a number of consecutive comparisons exceeding a counter threshold.

20. The method of claim 18, wherein the manual steering condition further comprises the current encoder rate being outside the acceptable encoder rate range by a difference exceeding a difference threshold.

* * * * *